United States Patent Office 2,985,671
Patented May 23, 1961

2,985,671
2α-METHYL-6-DEHYDRO STEROIDS, 21-ESTERS THEREOF AND INTERMEDIATES

J Allan Campbell, Kalamazoo, John C. Babcock, Portage Township, Kalamazoo County, and John A. Hogg, Kalamazoo, Mich., assignors to The Upjohn Company, Kalamazoo, Mich., a corporation of Michigan No Drawing. Filed Mar. 29, 1956, Ser. No. 574,614

8 Claims. (Cl. 260—397.45)

The present invention relates to novel steroids and is more particularly concerned with 2-substituted-3-keto-11-oxygenated-4,6-pregnadienes. In all designations of 2-alkyl, 2-lower-alkyl and 2-methyl in this application the 2α-configuration is intended.

The novel compounds of the present invention and the process of production therefor may be represented by the following sequence of formulae:

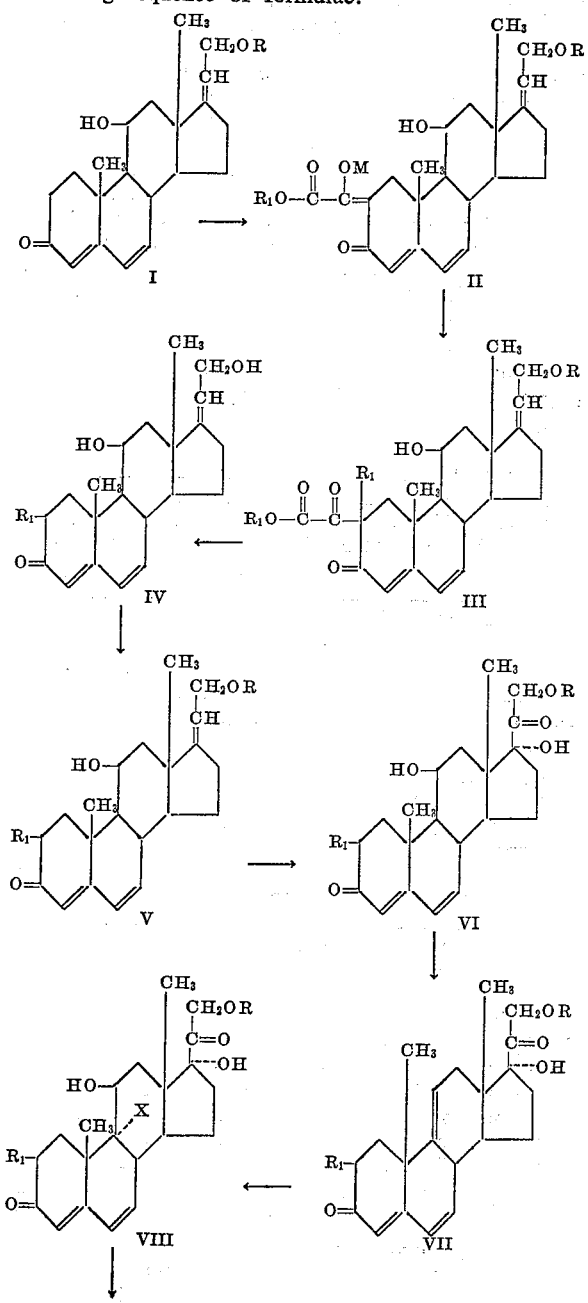

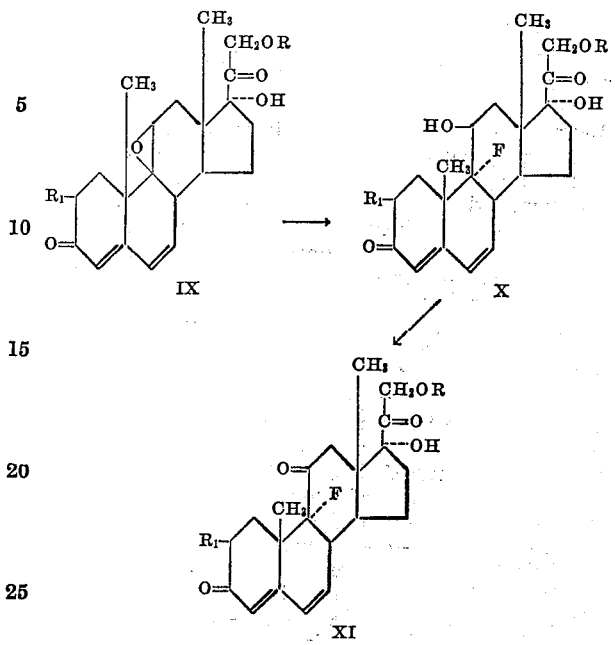

wherein R is selected from the group consisting of hydrogen and acyl in which the acyl radical is of an organic carboxylic acid, preferably a hydrocarbon carboxylic acid containing from one to eight carbon atoms, inclusive, $R_1$ is a lower-alkyl containing from one to eight carbon atoms, inclusive, M is an alkali metal of atomic weight 6 thru 41 and X is a halogen of atomic weight 33 thru 130.

The process of the instant invention comprises: treating a 21-ester of 11β,21-dihydroxy-4,6,17(20)-[cis]-pregnatrien-3-one(I) with a lower alkyl ester of oxalic acid in the presence of an alkali metal base to give the corresponding alkali metal enolate of 2-lower-alkyloxyoxalyl-11β,21-dihydroxy-4,6,17(20)-[cis]-pregnatrien-3-one (II). The alkali metal enolate (II) of its 21-esters produced by esterification in conventional manner, such as with anhydride or halides or organic carboxylic acids, preferably hydrocarbon carboxylic acids containing from one to eight carbon atoms, inclusive, is thereupon treated with a lower alkyl bromide or iodide to give a 2-lower-alkyloxyoxalyl - 2 - lower - alkyl - 11β,21 - dihydroxy-4,6,17(20)-[cis]-pregnatrien-3-one or the corresponding 21-ester thereof (III), which is hydrolyzed with an alkali base, such as an alkali alkoxide to give 2-lower-alkyl-11β,21 - dihydroxy - 4,6,17(20) - [cis] - pregnatrien-3-one (IV). Esterification of (IV) is productive of the 21-ester, 2 - lower - alkyl - 11β - hydroxy - 21 - acyloxy-4,6,17(20)-[cis]-pregnatrien-3-one (V). The ester (V) is thereupon treated with osmium tetroxide in the presence of a peroxide, such as hydrogen peroxide or an amine oxide peroxide, such as N-methylmorpholine oxide peroxide to give 2-lower-alkyl-11β,17α,21-trihydroxy-4,6-pregnadien-3,20-dione 21-acylate (VI). Compound (VI) by hydrolysis in a mildly alkali medium (preferably in a nitrogen atmosphere) provides the free triol, 2-lower-alkyl - 11β,17α,21 - trihydroxy - 4,6 - pregnadien - 3,20-dione which can be esterified in conventional manner to provide 2-lower-alkyl-11β,17α-dihydroxy-21-acyloxy-4,6-pregnadiene-3,20-dione. Oxidation of this ester with chromic acid produces 2-lower-alkyl-17α-hydroxy-21-acyloxy-4,6-pregnadien-3,11,20-trione. Dehydration of 2-lower-alkyl - 11β,17α,21 - trihydroxy - 4,6 - pregnadiene - 3,20-dione 21-acylate, illustratively with a hypohalous acid and anhydrous sulfur dioxide produces 2-lower-alkyl-17α-hydroxy - 21 - acyloxy - 4,6,9(11) - pregnatriene - 3,20- dione (VII). Addition of a hypohalous acid such as hypochlorous or hypobromous acid to the thus-obtained 2-lower - alkyl - 17α - hydroxy - 21 - acyloxy - 4,6,9(11)-pregnatriene-3,20-dione results in 2-lower-alkyl-9α-halo-11β,17α dihydroxy - 21 - acyloxy - 4,6 - pregnatriene-3,20-dione (VIII) which by treatment with a base such as anhydrous potassium acetate yields the epoxy compound, 2 - lower - alkyl - 9β,11β - epoxy - 17α - hydroxy-21-acyloxy-4,6-pregnadiene-3,20-dione (IX). Treatment of the epoxy compound (IX) with hydrogen fluoride or other hydrogen fluoride releasing agents provides the active fluoro derivative, 2-lower-alkyl-9α-fluoro-11β,17α-dihydroxy - 21 - acyloxy - 4,6 - pregnadiene - 3,20 - dione (X). Oxidation of compound (X) with chromic acid in acetic acid provides the 2-lower-alkyl-9α-fluoro-17α-hydroxy-21-acyloxy-4,6-pregnadiene,3,11,20-trione (XI). Oxidation of compound VIII in the same manner as compound X results in other 2-lower-alkyl-9α-halo-17α, hydroxy-21-acyloxy-4,6-pregnadiene-3,11,20-trione wherein halo is chloro, bromo, or iodo. Hydrolysis of the esters provides the free alcohols of these compounds which are useful either per se or as intermediates to produce by reesterification more desirable esters of the free alcohols, such as 21-monoesters of 2-lower-alkyl-11β,17α,21-trihydroxy - 4,6 - pregnadiene - 3,20 - dione, 2 - lower - alkyl-17α,21 - dihydroxy - 4,6 - pregnadiene - 3,11,20 - triones and their 9α-halo derivatives.

It is an object of the present invention to produce certain 2-substituted - 3 - keto - 11 - oxygenated - 4,6-pregnadienes. It is a particular object of the present invention to produce 2-lower-alkyl-11β,21-dihydroxy-4,6,17(20) - [cis] - pregnatriene - 3,20 - dione, 2 - lower-alkyl - 11β - hydroxy - 21 - acyloxy - 4,6,17(20) - [cis]-pregnatriene - 3,20 - dione, 2 - lower - alkyl 17α - hydroxy - 21 - acyloxy - 4,6 - pregnadiene - 3,11,20 - trione, 2 - lower - alkyl - 17α,21 - dihydroxy - 4,6 - pregnadiene - 3,11,20 - trione, 2 - lower - alkyl - 9α - halo-11β,17α - dihydroxy - 21 - acyloxy - 4,6 - pregnadiene-3,20 - dione, 2 - lower - alkyl - 9α - halo - 17α - hydroxy-21 - acyloxy - 4,6 - pregnadiene - 3,11,20 - trione, and 2-lower - alkyl - 9α - halo - 17α,21 - dihydroxy - 4,6 - pregnadiene - 3,11,20 - trione wherein the lower-alkyl contains from one to eight carbon atoms, inclusive; the acyl radical is of an organic carboxylic acid, preferably of a hydrocarbon carboxylic acid, containing from one to eight carbon atoms, inclusive, and halo denotes the halogen atoms of atomic weight 17 thru 130, inclusive. It is another object of the instant invention to provide a process for the production of the intermediates of such 2-substituted-3-keto-11-oxygenated-4,6-pregnadienes, especially the compound indicated by Formulae II thru V, inclusive and VII and IX. Other objects will be apparent to those skilled in the art to which this invention pertains.

The compounds of the instant invention are important intermediates in the production of highly active adrenal cortical hormones and in addition possess activity per se. For example, selective hydrogenation of 2-methyl-11β,17α - dihydroxy - 21 - acyloxy - 4,6 - pregnadiene-3,20-dione, dissolved in methanol, in the presence of a five percent palladium-charcoal catalyst and potassium hydroxide, as shown in U.S. Patent 2,697,106, produces the highly active 2-methylhydrocortisone, while similarly selective hydrogenation of 2-lower-alkyl-9α-halo-11β,17α-dihydroxy-21-acyloxy-4,6-pregnadiene-3,20-dione and hydrolysis produces the extremely active series of aldosterone-like and highly antiphlogistic 2-alklated-9α-halohydrocortisones, of which the 2-methyl-9α-fluoro-hydrocortisone is one of the most important members. Similarly, selective hydrogenation of the corresponding 11-keto analogs, such as 2-lower-alkyl-17α-hydroxy-21-acyloxy-4,6-pregnadiene-3,11,20-trione and the corresponding 9α-halo compounds thereof, such as the 2-methyl-9α-fluoro-17α-hydroxy - 21 - acyloxy - 4,6 - pregnadiene - 3,11,20-trione provides the corresponding 2-methylcortisone and 2 - methyl - 9α - fluoro - cortisone 21-esters respectively. All of these compounds are important adrenal cortical steroids having pronounced adrenal hormone-like activity such as liver glycogen deposition, with few side reactions. While the chloro, bromo, and iodo derivatives of these 2-alkylated cortisone and hydrocortisone compounds have activity of considerable significance, the greatest activity has been found in those having in the 9α-position a fluorine atom. The 2-methyl-11β,17α,21-trihydroxy - 4,6 - pregnadiene - 3,20 - dione per se and the 21-esters thereof as well as the 2-methyl-9α-fluoro-11β,17α,21-trihydroxy-4,6-pregnadiene-3,20-dione and the esters thereof have adrenocortical hormonal activity particularly glucocorticoid activity greater than hydrocortisone. Similarly the corresponding 11-keto analogs, 2-methyl - 17α,21 - dihydroxy - 4 - pregnene - 3,11,20 - trione and the halo compounds such as 2-methyl-9α-fluoro-17α,21-dihydroxy - 4 - pregnene-3,11,20-trione and esters thereof are useful as cortical hormonal agents in the same manner as the corresponding 11β-hydroxy analogs. These compounds also show mineral corticoid activity and anti-inflammatory activity.

The anti-inflammatory activity render these steroids particularly valuable for topical use such as dermatological and ophthalmic ointments or therapeutic dentifrices. A suitable dermatological and ophthalmic ointment illustratively has the following composition:

| | Lbs. |
|---|---|
| Wool fat USP | 100 |
| Mineral oil USP | 125 |
| 2 - methyl - 9α - fluoro - 11β,17α - dihydroxy - 21-acetoxy - 4,6 - pregnadiene - 3,20 - dione (micronized) | 1.5 |
| White petrolatum USP, q.s.-ad | 500 |

Incorporation of an antibiotic in the intment, especially neomycin sulfate, has surprising therapeutic advantage, each active ingredient potentiating and supplementing the useful properties of the other. Such an ointment is as follows:

| | Lbs. |
|---|---|
| Wool fat USP | 100 |
| Mineral oil USP | 125 |
| Neomycin sulfate (microatomized) | 0.5 |
| 2 - methyl - 9α - fluoro - 11β,17α - dihydroxy - 21-acetoxy - 4 - pregnene - 3,20 - dione (micronized) | 1.5 |
| White petrolatum USP, q.s.-ad | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracycline, chlortetracycline, tetracycline, chloramphenicol and the sulfonamides can be used to enhance the usefulness of the above ointments.

A suitable therapeutic dentifrice for inflammatory conditions of the gingiva has illustratively the following compostion:

| | Lbs. |
|---|---|
| Precipitated calcium carbonate | 400 |
| Titanium oxide | 50 |
| Distilled water | 450 |
| Methyl cellulose | 10 |
| Sodium lauryl sulfate | 30 |
| Glycerine | 50 |
| Methyl para-hydroxybenzoate | 1 |
| 2 - methyl - 9α - fluoro - 11β,17α - dihydroxy - 21-acetoxy - 4,6 - pregnadien - 3 - one | 1 |
| Cinnamon oil | 4 |
| Peppermint oil | 2 |
| Spearmint oil | 2 |

To prepare this therapeutic dentifrice, methyl para-hydroxybenzoate is dissolved in 150 parts of boiling water and poured over the methyl cellulose. While the mass swells and softens stirring is continued until cool. Thereupon the remainder of the water is added, then in the stated order the glycerin, calcium carbonate and titanium oxide, the sodium lauryl sulfate and the steroid. Homogeneity is improved my millings and thereupon the flavoring is incorporated. Obviously other flavoring may be used. In addition saccharine may be used for sweetening (from 0.5 to 1 part per 1000 parts of dentifrice). The titanium oxide may if desired be substituted by calcium carbonate or dicalcium phosphate. Other ingredients, such as antibiotics, for example, neomycin, penicillin, tetracycline, or the like, can be added and the particular steroid, 2-methyl-9α-fluoro-11β,17α-dihydroxy-21-acetoxy-4,6-pregnadien-2-one may be substituted by other 2-alkyl-11,17-oxygenated-4,6-pregnadien-3-ones such as shown and produced in Examples 11 thru 14, 18, 20, 22 and 26 thru 33. The amount of steroid in the dentifrice may be up to 0.5 percent for the fluoro substituted steroids in this disclosure and up to 2.5 percent for the other halogenated or non-halogenated steroid shown in the examples.

A dental ointment useful for topical application in cases of desquamative gingivitis can be prepared as described below:

|  | Percent |
|---|---|
| White petrolatum USP | 94% |
| White wax USP M.P. (61–65° C.) | 5% |
| 2-methyl-9α-fluoro-11β,17α-dihydroxy-21-acetoxy-4,6-pregnadiene-3,20-dione | 0.2% |
| Flavoring oil | 0.8% |

The white wax and white petrolatum are melted and stirred until the temperature reaches fifty degrees centigrade. The micronized steroid and the flavoring oil are added and the ointment is allowed to cool with continuous vigorous stirring until it congeals. The congealed mixture is then milled to achieve greater uniformity.

Instead of 2-methyl-9α-fluoro-11β,17α-dihydroxy-21-acetoxy-4,6-pregnadiene-3,20-dione, other steroids such as described in Examples 11 thru 14, 18, 20, 22, and 26 thru 33 may be used, usually in amounts from 0.05 to 0.5 percent for the fluoro steroids and from 0.1 to 2.5 percent for the other halo or non-halogenated steroids. Additionally, antibiotics, such as for example, neomycin, bacitracin, tetracycline, Aureomycin, Terramycin, or the like, and/or sulfonamides may be incorporated in this ointment. The starting materials for the instant process are 11β,21-dihydroxy-4,6,17(20)-[cis]-pregnatrien-3-one 21-acylates such as the 21-acetate, or the free alcohol. 11β,21-dihydroxy-4,6,17(20)-[cis]-pregnatrien-3-one and the 21-esters thereof are prepared by methods such as shown in Preparations 1 thru 7.

In carrying out the process of the present invention, 11β,21-dihydroxy-4,6,17(20)-[cis]-pregnatrien-3-one or a selected 21-ester thereof is admixed with a selected alkali metal condensation catalyst and a dialkyl ester of oxalic acid in an organic solvent. The order of mixing to produce the alkali-metal salt of the compound represented by Formula II is not critical. Reaction solvents which can conveniently be employed in the condensation, include benzene, toluene, xylene, and the like aromatic hydrocarbons, methanol, ethanol, isopropyl alcohol, tertiary butyl alcohol, and other alcohols, tetrahydrofuran, dioxane, diethyl ether, Skellysolve B hexane hydrocarbons, and other aliphatic hydrocarbons, mixtures of these solvents and other essentially unreactive solvents. Benzene, with or without small percentages of added alkanol, or tertiary butyl alcohol are usually the preferred solvent. The preferred condensation agent is a lower-alkyl oxalic acid ester such as methyl, ethyl, propyl, butyl, pentyl, hexyl, octyl, phenyl, benzyl, or the like oxalic acid esters, with methyl and ethyl oxalate preferred. The condensation is generally conducted at a temperature between about zero degrees centigrade and the boiling point of the reaction mixture. The reaction proceeds with satisfactory rapidity at between about room temperature (twenty to thirty degrees centigrade) and about seventy degrees centigrade, and temperatures substantially above or below this range are therefore not required. The time necessary to obtain substantially complete reaction varies considerably, between about five minutes and several days, depending upon the reaction solvent, the reaction temperature, the selected ester of oxalic acid and the alkali-metal condensation catalyst employed. When methyl or ethyl oxalate and tertiary butyl alcohol are employed at about fifty degrees centigrade, the reaction is usually more than half completed in a few minutes. The condensation step is preferably carried out in the absence of any significant amounts of water. To insure the essentially complete exclusion of water from the reaction mixture, the solvent is carefully dried with a drying agent, such as, for example, anhydrous sodium sulfate, calcium sulfate, calcium chloride, phosphorus pentoxide, sodium, or the like, or when an aromatic hydrocarbon is used as a solvent, a portion of the solvent is distilled before using.

Alkali metal condensation catalysts include the alkali metal alkoxides, wherein the alkyl radical of the alkoxy group contains from one to eight carbon atoms, inclusive, and wherein the alkali metal is of atomic weight six thru forty, such as sodium methoxide, sodium ethoxide, sodium isopropoxide, potassium tertiary butoxide, lithium methoxide, and the like, the alkali metals, the alkali metal hydrides, alkali metal amides e.g., sodium amide, and alkyl alkali metals, for example, triphenylmethyl sodium, and the like. Of these, the alkali metal alkoxides, especially sodium methoxide and sodium ethoxide are preferred for their convenience and consistently satisfactory results. The alkali metal alkoxides may be used solvent-free, dissolved or suspended in a non-reactive solvent, or in situ in the alkanol in which said alkali metal alkoxide was prepared. Potassium is conveniently used as the solution formed by its reaction with tertiary butyl alcohol according to procedures well known in the art. The theoretical alkali metal condensation catalyst required is one mole per mole of steroid. Somewhat more than the theoretical amount is usually employed.

The thus produced alkali metal enolate may be separated by the addition of a large volume of an organic solvent in which the alkali metal enolate is insoluble, such as ether, pentane, or benzene, for example. Another method of producing somewhat purer alkali metal enolate comprises acidification of a cold aqueous solution of the thus precipitated alkali metal enolate to precipitate the free enol and then treating a solution of the free enol in ether or benzene with a chemical equivalent of sodium methoxide, thus reprecipitating the sodium enolate. When the condensation is carried out in the presence of a substantial amount of methyl or ethyl alcohol, removal of said alcohol by distillation at reduced pressure before the addition of an additional amount of solvent is preferred, if a high yield of isolated product is to be obtained.

The thus produced alkali metal enolate of 2-lower-alkyloxyoxalyl - 11β,21 - dihydroxy - 4,6,17(20) - [cis] - pregnatrien-3-one or the corresponding 21-ester thereof is alkylated by the addition of a lower alkyl halide, such as methyl iodide, ethyl iodide, propyl bromide, isopropyl iodide, butyl chloride, bromide and iodide, pentyl chloride, bromide, and iodide, hexyl, heptyl, and octyl chloride and bromides, allyl bromide, phenyl bromide and iodide, benzyl chloride, bromide or iodide, and the like. In the preferred embodiment the alkyl halide is added to the steroid, dissolved in an organic solvent, such as methylene chloride, ethylene dichloride, chloroform, carbon tetrachloride, pentanes, hexanes, or the like. After adding the alkyl halide to the solution, the reaction is continued for several hours, for example, about eight to about 72 hours at a reaction temperature of about room temperature, twenty to thirty degrees centigrade. Higher temperatures shorten this reaction time considerably. A convenient method of alkylation was the addition of the selected alkyl halide to the reaction product resulting from the condensation step, preferably after the decomposition of any excess alkali metal condensation catalyst. Satisfactory yields are also obtained by stirring the solution of the free active methylene compound, the metal enolate of 2-alkoxyoxalyl - 11β,21 - dihydroxy - 4,6,17(20) - [cis]-pregnatrien-3-one or esters thereof with the selected alkyl halide. Alkali metal alkylation catalysts such as sodium or potassium carbonate promote the above reaction, but the reaction is operative without such catalysts. In this manner a 2-lower-alkyloxyoxalyl-2-lower-alkyl-11β,21-dihydroxy-4,6,17(20)-[cis]-pregnatrien-3-one is obtained.

The reversal step of the present invention involves the removal of the alkoxyoxalyl group from the 2-position leaving the alkyl group at the 2-position thus producing a 2 - lower - alkyl - 11β,21 - dihydroxy - 4,6,17(20) - [cis]-pregnatrien-3-one or the respective 21-ester thereof. The reversal step of the present invention is produced by the alkali metal alkylation catalyst, sodium or potassium carbonate, in the presence of water or a lower-alkanol. The reversal reaction is especially promoted by the presence of hydroxide or alkoxide, particularly methoxide and ethoxide ions. After reacting the 2-alkyloxyoxalyl-2-alkyl - 11β,21 - dihydroxy - 4,6,17(20) - [cis] - pregnatrien-3-one or a 21 ester thereof with a base such as methanol and sodium methoxide, ethanol and sodium ethoxide or methoxide at room temperature, the mixture is poured into a large amount of water and the product is separated by conventional means such as extraction, filtration, or the like, and the material, a 2-alkyl-11β,21-dihydroxy-4,6,17(20)-[cis]-pregnatrien-3-one (or a 21-ester thereof), is purified by recrystallization, additional extraction of impurities, chromatography, or the like, as deemed necessary.

The 21-acyloxy group of a 2-lower-alkyloxyoxalyl-2-alkyl - 11β - hydroxy - 21 - acyloxy - 4,6,17(20) - [20]-pregnatrien-3-one is removed in the reversal reaction if the acyl group is of a simple unhindered acid such as acetic, propionic, or the like. If the acyl group is of a sterically hindered acid such as dineopentylacetic, trimethylacetic, or the like, the 21-ester group remains intact. In many other cases, a mixture of the ester and the free alcohol is obtained. If desired, the ester is reformed by conventional procedure, such as reacting the obtained 2 - lower - alkyl - 11β,21 - dihydroxy - 4,6,17(20) - [cis]-pregnatrien-3-one with an acid anhydride or acid halide of an organic carboxylic acid, preferably a hydrocarbon carboxylic acid containing from one to eight carbon atoms, inclusive, in pyridine or in a neutral organic solvent such as benzene, toluene, or the like.

The thus obtained 2-lower-alkyl-11β,21-dihydroxy-4,6,17(20)-[cis]-pregnatrien-3-one or the 21-acyloxy esters thereof is hydroxylated with an hydroxylating agent and an oxidizing agent to give the corresponding 2-lower-alkyl-11β,17α,21-trihydroxy-4,6-pregnadiene-3,20-dione.

The hydroxylation of a $\Delta^{17(20)}$-21-acyloxy steroid to produce a 17α,20 dihydroxy steroid is a well known reaction (see, for example, Ruzicka and Mueller, Helv. Chim. Acta, 22, 57 (1939) and U.S. Patent 2,492,194). In this reaction, a metal oxide is ordinarily employed to add to the double bond to produce, upon hydrolysis, a glycol. Osmium tetroxide is the metal oxide of choice. For a discussion of the hydroxylating abilities of the metal oxides, preferably from groups IV, V and VI of the periodic table, see Milas, J. Am. Chem. Soc. 59, 2342 (1937) and Mudgen and Young, J. Chem. Soc. 1944, 2988. Examples of such hydroxylating metal oxides or derivatives thereof include manganese dioxide, vanadium pentoxide, chromium trioxide, pertungstic acid, permolybdic acid, selenium dioxide, etc.

The first recognized example of an oxidative hydroxylation of a steroid is found in Prins and Reichstein, Helv. Chim. Acta, 25, 300 (1942), reporting the use of osmium tetroxide and chloric acid, for the oxidative hydroxylation of a $\Delta^{20(21)}$-steroid to produce a 20-keto-21-hydroxy steroid. The concept of oxidative hydroxylation outside the field of steroidal chemistry was first demonstrated, with hydrogen peroxide, by Criegee, Annalen der Chemie, 522, 75 (1936).

Oxidizing agents which may be employed in the oxidative hydroxylation step of the present invention are the oxidizing agents which contribute an oxygen atom to the reaction and include, hydrogen peroxide, alkyl peroxides, peracids, chloric acid, periodic acid, acetyl peroxide, benzoyl peroxide, tertiary amine oxide peroxides, aryliodo oxides, lead tetraacetate, manganese dioxide, mercury diacetate and the like oxygen donating agents. The use of osmium tetroxide and hydrogen peroxide in the oxidative hydroxylation of certain $\Delta^{17(20)}$-21-substituted steroids is claimed in U.S. Patents 2,662,854 and 2,668,816. The use of amine oxide-peroxides with osmium tetroxide in the oxidative hydroxylation of $\Delta^{17(20)}$-21-acyloxy steroids is claimed in the copending application of Schneider and Hanze, S.N. 425,315, filed April 23, 1954, and the use of aryliodo oxides with osmium tetroxide in the oxidative hydroxylation of these same steroids is claimed in the copending application of Schneider, S.N. 443,418, filed July 14, 1954. The use of hydrogen peroxide, an amine oxide peroxide or an aryliodo oxide as the oxidizing agent in the oxidative hydroxylation of the present invention is preferred. The use of these reagents is discussed more fully below.

The amine oxide peroxides which may be employed in the oxidative hydroxylation step of this invention are prepared by the reaction of some tertiary amines with two molar equivalents of hydrogen peroxide or by the reaction of a tertiary amine oxide with one molar equivalent of hydrogen peroxide. Amine oxide peroxides are a novel class of oxidizing agents. For the most part, they have a higher oxidation potential than the hydrogen peroxide from which they are prepared.

The amine oxide peroxides of the present invention are preferably non-aromatic, i.e., the molecule is devoid of an aromatic group of any kind. The non-aromatic tertiary amine oxide peroxides include the N-alkylcyloalkylamine oxide peroxides, e.g., N-alkylmorpholine oxide peroxide, N-alkylpyrrolidine oxide peroxides, and N-alkylpiperidine oxide peroxides, the trialkylamine oxide peroxides, e.g., trimethylamine oxide peroxide, triethylamine oxide peroxide, methyldiethylamine oxide peroxide, ethyldimethylamine oxide peroxides, the alkanolamine oxide peroxides, e.g., dimethylethanolamine oxide peroxide, pyrrolidylethanol oxide peroxide, piperidylethanol oxide peroxide or the like. Of these amine oxide peroxides, triethylamine oxide peroxide and N-methylmorpholine oxide peroxide are especially advantageous.

The organic polyvalent iodo oxides which may be employed in the oxidative hydroxylation step of this invention are organic iodo compounds having at least one titratable oxygen atom attached to the iodine atoms. The presence of a titratable iodo oxide oxygen atom can be determined in the usual manner with KI, acid and sodium thiosulfate. The known examples of these iodo oxides are iodoso, iodyl and iodoxy compounds and salts thereof. The iodonium compounds are not included in the term "iodo oxides" as used herein since the hydroxy group of the iodonium compounds is ionic in nature and is not therefore directly attached to the iodine atom, but merely associated with it ionically. The iodoso compounds have one oxygen atom attached to the iodine atom; the iodoxy compounds have two oxygen atoms attached.

Many iodo oxides are disclosed in Willgerodt, "Die Organischem Verbindungen Mit Mehrwertigem Jod," F. Enke, Stuttgart (1914). Other references include R. Sandin, "Organic Compounds of Polyvalent Iodine," Chem. Rev. 32, 249 (1943); Sidgwick, "Chemical Elements and Their Compounds," vol. II, 1243–1260, Oxford Univ. Press (1950); and Mason et al., J. Chem. Soc. 1669 (1935). The latter reference discloses the iodyl compounds.

In accord with these references, iodo oxides can be prepared from aryl iodo compounds or other vinyl iodides whose double bond is also modified in some way, e.g., by halogenation, as in α-chloro-iodoethylene, chloro-iodofumaric acid or α-chloro-iodoacrylic acid.

Examples of the known aryl iodo oxides include iodosobenzene, phenyliodosoacetate, diphenyliodyl hydroxide and acetate, phenyliodosopropionate, iodoxybenzene, the ring alkylated iodoso and iodoxybenzenes, and the oxides of iodo-naphthylene, iodobenzoquinone and iodobenzaldehyde, iodo-benzophenone, iodosalicylic acid, etc.

In carrying out the oxidative hydroxylation step of the invention, the starting steroid is advantageously dissolved in an inert organic solvent, for example, tertiary butyl alcohol, diethyl ether, tetrahydrofuran, or the like, and the hydroxylating agent preferably osmium tetroxide and the oxidizing agent mixed therein. Advantageously, though not necessarily, the hydroxylating agent is added after the addition of the oxidizing agent. Advantageously also, the osmium tetroxide and the oxidizing agent peroxide are added in solutions of the same solvent used as the vehicle for the reaction.

The amount of the preferred osmium tetroxide hydroxylating agent employed in the reaction can be varied widely, for example, from about 0.2 molar equivalent to 0.001 molar equivalent. Advantageously, however, not more than 0.05 molar equivalent is used.

The amount of oxidizing agent theoretically required to produce a 17-hydroxy-20-keto-21-acyloxy steroid is two oxidizing equivalents for each mole of osmate ester formed in the reaction. It has been found, however, that in the process of this invention, more than the theoretical amount of oxidizing agent is ordinarily necessary to obtain a complete reaction. For optimum results in the process of this invention, therefore, it is usually desirable to use the oxidizing agent in excess of the theoretical amount. For example, optimum results are ordinarily obtained using between about 2.2 and about 2.75 equivalents of amine oxide peroxide or aryl iodo oxide, calculated on the starting steroid. The course of the oxidative hydroxylation reaction can be readily determined by the titration of aliquot portions for residual oxidizing agent. Ordinarily, the presence of small amounts of water in the reaction mixture does not adversely affect the yield of desired product. However, to ensure optimum yields of desired product when employing hydrogen peroxide or an amine oxide peroxide, the reaction advantageously may be performed under substantially anhydrous conditions, e.g., in dry tertiary butyl alcohol, or like solvent.

The reaction temperature for the oxidative hydroxylation step normally is between about fifteen and about thirty degrees centigrade although higher or lower temperatures are operable, e.g., between about minus ten and about plus seventy degrees centigrade. In place of the solvents noted above, there may be used any inert solvent which is a solvent for the reagents. Suitable solvents include diethylether, dioxane, isopropylalcohol, tetrahydrofuran, tertiary butyl alcohol, tertiary amyl alcohol, ethanol and methanol.

Hydrolysis of this material by alkali, preferably in a nitrogen atmosphere, produces the free triol, 2-lower-alkyl - 11β,17α,21 - trihydroxy - 4,6 - pregnadiene - 3,20-dione. Esterification of the triol with halides and hydrides of organic carboxylic acids or hydrocarbon carboxylic acids containing from one to eight carbon atoms gives 2 - lower - alkyl - 11β,17α - dihydroxy - 21 - acyloxy-4,6-pregnadiene-3,20-diones.

Oxidation of the 2-lower-alkyl-11β,17α-dihydroxy-21-acyloxy-4,6-pregnadiene-3,20-dione with chromic acid is productive of the corresponding 2-lower-alkyl-17α-hydroxy-21-acyloxy-4,6-pregnadiene-3,11,20-trione.

In order to obtain the corresponding 9α-halo compounds, the 2 - lower - alkyl - 11β,17α,21 - trihydroxy-4,6-pregnadiene-3,20-dione 21-acylate is dehydrated to the corresponding 2-lower-alkyl-17α,21-dihydroxy-4,6,9(11)-pregnatriene-3,20-dione 21-acylate by methods known in the art. Suitable dehydrating agents are for example phosphorus oxychloride, hydrochloric acid, or sulfuric acid in acetic acid, or pyrolysis as shown by U.S. Patents 2,640,838 and 2,640,839. In the preferred embodiment of the present invention the dehydration is effected by reacting the 11β-hydroxy compound with an N-haloamide or N-haloimide in an organic base and treating the thus produced intermediate 11-hypohalite with dry sulfur dioxide in an organic base. As reagents for the production of an 11-hypohalite, the N-haloamide or N-haloimide are used wherein the halogen has an atomic weight from 34 to 130, inclusive, preferably chlorine or bromine. Examples of such compounds are N-chloroacetamide, N-bromoacetamide, N - chlorosuccinimide, N - bromosuccinimide, N-iodosuccinimide, 3-bromo-5,5-dimethylhydantoin and 1,3-dibromo-5,5-dicethylhydantoin. Ordinarily an amount in excess of a molar equivalent, calculated on the starting 11β-hydroxy steroid, is employed. The base employed in the production of the 11-hypohalite is a tertiary amine wherein the amino nitrogen is a member of an aromatic ring, for example, the pyridines, that is, pyridine, alkyl-pyridines, piccoline, lutidine, collidine, conyrine, parvuline, or the like, or lower fatty amides such as formamide, methylformamide and dimethylformamide. The base is preferably employed in a large molar excess, calculated on the starting 11β-hydroxy steroid, for example, ten molar equivalents, and is preferably the sole reaction solvent. The reaction to produce an 11-hypohalite is generally conducted under anhydrous conditions preferably containing less than 0.1 molar equivalent of water calculated per mole of steroid. Large proportions of water decrease the yield. The temperature of the reaction is between minus forty and plus seventy degrees centigrade, the lower limit being determined by the solubility of the reaction and solvents and the upper limit being determined by the amount of side reaction. Ordinarily, room temperature (twenty to thirty degrees centigrade) is preferred for convenience and the consistently high yields of the desired product which are obtained at this temperature. A reaction period between five minutes to three hours is usually employed. At higher temperatures, above thirty degrees centigrade, short reaction times are sufficient to produce completeness of the reaction.

The thus produced 2-lower-alkyl-11β,17α,21-trihydroxy-4,6-pregnadiene-3,20-dione 11β-hypohalite 21-acylate is then treated with anhydrous sulfur dioxide in the presence of an organic base as described hereinbefore. The anhydrous sulfur doxide can be in the form of gaseous or liquid sulfur dioxide or in the form of a material which in situ produces sulfur dioxide, for example, alkali metal hyposulfite. The reaction temperature ranges substantially within minus forty and plus seventy degrees centigrade and preferably room temperature (twenty to thirty degrees centigrade). The thus obtained product, a 2-lower-alkyl-17α,21-dihydroxy-4,6,9(11)-pregnatriene-3,20-dione 21-acylate is isolated by conventional means such as extraction from the reaction mixture after the reaction mixture has been poured into excess of water. Organic water-immiscible solvents such as ether, chloroform, methylene chloride, carbon tetrachloride, ethyl acetate, benzene, hexanes, or the like, are used for the extraction. The thus obtained extracts are conveniently washed, dried and thereupon evaporated to give the crude 2 - lower - alkyl - 17α,21 - dihydroxy - 4,6,9(11)-pregnatriene-3,20-dione 21-esters which are purified by conventional means such as recrystallization or chromatography, as deemed necessary.

The thus obtained 2 - lower - alkyl - 17α,21 - dihydroxy-4,6,9(11)-pregnatriene-3,20-dione 21-acylate is converted to 2 - lower - alkyl - 9α - halo - 11β,17α,21 - triphydroxy-4,6-pregnadiene-3,20-dione acylate by adding a hypohalous acid such as hypochlorous or hypobromous acid. The hypohalous acid is usually added by reacting an N-halo acid amide or an N-halo acid imide with an acid to produce the hypohalous acid in situ. In the preferred embodiment of the invention, the steroid, a 2-alkyl-17α,21 - dihydroxy - 4,6,9(11) - pregnatriene - 3,20-dione or the esters thereof is dissolved in an organic solvent such as methylene chloride, tertiary butyl alcohol, dioxane, tertiary amyl alcohol, or the like, and reacted at room temperature with the hypobromous or hypochlorous acid releasing agent in the presence of an acid. Such hypohalous acid releasing agents include the N-bromoacetamide, the N-chloroacetamide, the N-bromosuccinimide, the N-iodosuccinimide, or the like, in the presence of water and an acid such as perchloric acid, dilute sulfuric acid, or the like. The reaction is usually carried out at room temperature, between fifteen to thirty degrees centigrade, however, lower or higher temperatures are operative for the process. The hypohalous acid releasing agent is generally used in one molar or slightly increased, for example 25 percent increased amounts compared to mole of steroid. A large excess of the hypohalous acid releasing agent while operative is undesirable since the excess of hypohalous acid has a tendency to react on other positions of the molecule. The reaction period is rather short and may vary between about four to five minutes to one hour. At the end of the reaction time excess of hypohalous acid is destroyed by the addition of sodium sulfite or other sulfites or hydrosulfites. The thus produced product, a 2-lower-alkyl-9α-halo-11β,17α-21-trihydroxy-4,6-pregnadiene-3,20-dione 21-acylate, wherein halo is of atomic weight between 33 and 130, is isolated from the reaction mixture by adding excess of water and extracting the compound with organic solvents or by recovering the precipitated compound through filtration. A crude product thus obtained may be recrystallized from acetone and Skellysolve B hexane hydrocarbons to give pure 2-lower-alkyl-9α-halo-11β,17α,21-trihydroxy-4,6-pregnadiene-3,20-dione 21-acylate.

The halo ester thus obtained can be hydrolyzed in an alcoholic acid medium to give the free triol, 2-lower-alkyl - 9α - halo - 11β,17α,21 - trihydroxy - 4,6 - pregnadiene-3,20-dione, which upon reesterfication gives additional esters.

Oxidizing the 21-ester of a 2-lower-alkyl-9α-halo-11β, 17α,21-trihydroxy - 4,6 - pregnadiene - 3,20 - dione, with chromic acid produces the corresponding pharmaceutically active (aldosterone-like and antiphlogistic) 2-lower-alkyl-9α-halo-17α,21-dihydroxy - 4,6-pregnadiene-3,11,20-trione 21-acylate which by hydrolysis gives the free diol, 2-lower-alkyl-9α-halo-17α,21-dihydroxy - 4,6-pregnadiene-3,11,20-trione.

To obtain the 9α-fluoro compounds, the 9β-11β-epoxy intermediates of the before-mentioned compounds, 2-lower - alkyl - 9β,11β - epoxy - 17α,21 - dihydroxy - 4,6-pregnadiene-3,20-dione esters, are first prepared. In this reaction a 2-lower-alkyl-9α-halo - 11β,17α,21-trihydroxy-4,6-pregnadiene-3,20-dione ester is heated in solution with a mild base, and preferably in the absence of water to avoid hydrolysis of the ester groups.

The bases useful for the cyclization include anhydrous potassium acetate, sodium bicarbonate, sodium acetate, or the like, with potassium acetate preferred. Solvents such as methanol, ethanol, acetone, tertiary butyl alcohol, or the like, may be used. The reaction time is between one half hour and 24 hours; generally a period between three and twelve hours is sufficient. The thus obtained 2-lower-alkyl - 9β,11β - epoxy - 17α,21 - dihydroxy - 4,6-pregnadiene-3,20-dione is isolated from the reaction mixture by pouring the reaction mixture into excess water and extracting with methylene chloride or other water-immiscible solvents such as ether, Skellysolve B hexanes, pentanes, benzene, ether, ethyl acetate, chloroform, carbon tetrachloride, or the like. Evaporation of the solvent of the extracts produces the 2-lower-alkyl-9β,11β-epoxy-17α,21-dihydroxy-4,6-pregnadiene-3,20-dione 21-acylate.

The thus obtained 2-lower-alkyl-9β,11β-epoxy-17α,21-dihydroxy - 4,6 - pregnadiene - 3,20 - dione 21-acylate is thereupon reacted with 48 percent hydrofluoric acid in solution in the presence of a strong acid. As solvents for this reaction methylene chloride, ethylene dichloride, chloroform, carbon tetrachloride or the like is useful, with methylene chloride preferred. As acid catalysts, perchloric acid, toluene-sulfonic acid, sulfuric acid or the like may be used. The reaction is carried out at room temperature (twenty to thirty degrees centigrade) preferably with stirring. The period of reaction is from one to 24 hours with a period from one to twelve hours usually sufficient. After the reaction is terminated, the mixture is poured into water and neutralized with a dilute base such as sodium bicarbonate, potassium bicarbonate, or the like. Excess of strong bases can also be used. The reaction mixture is then extracted with a water-immiscible solvent such as methylene chloride, the organic layer is separated from the water mixture, washed with water, dried and evaporated to give the crude 2-lower-alkyl-9α-fluoro-11β, 17α,21 - trihydroxy - 4,6 - pregnadiene - 3,20 - dione 21-acylate. The thus obtained crude compound is purified through recrystallization or chromatography as deemed necessary.

The 2 - lower - alkyl - 9α - fluoro - 11β,17α,21 - trihydroxy - 4,6 - pregnadiene - 3,20-dione esters obtained by this process can be hydrolyzed to give the 2-lower-alkyl - 9α - fluoro - 11β,17α,21 - trihydroxy - 4,6 - pregnadiene-3,20-dione which is esterified with acyl halides or acyl anhydrides in pyridine solution at room temperature to give the corresponding 21-esters of 2-lower-alkyl-9α-fluoro - 11β,17α,21 - trihydroxy - 4,6 - pregnadiene - 3,20-dione.

Oxidation of the 2-lower-alkyl - 9α-fluoro - 11β,17α,21-trihydroxy - 4,6 - pregnadiene - 3,20 - dione 21 - acylate with chromic acid produces the corresponding 2-lower-alkyl - 9α - fluoro - 17α-21 - dihydroxy - 4,6 - pregnadiene-3,11,20-trione 21-acylate which is hydrolyzed with sodium bicarbonate in ethanol in a nitrogen atmosphere to give the free triol, 2-lower-alkyl-9α-fluoro-17α-21-dihydroxy-4,6-pregnadiene-3,11,20-trione.

The following examples are illustrative of the process and products of the present invention, but are not to be construed as limiting.

PREPARATION 1

*Methyl 3,11-diketo-6-bromo-4,17(20)-[cis]-pregnadien-21-oate*

A solution of 7.2 grams (0.05 mole) of methyl 3,11-diketo-4,17(20)-[cis]-pregnadien - 21 - oate and 200 milligrams of para-toluenesulfonic acid in fifty milliliters of acetic anhydride was heated at its refluxing temperature for four hours while bubbling nitrogen through the reaction mixture. The solvent was then removed by distillation at reduced pressure and the residue was triturated with ethyl acetate. The insoluble material was recrystallized from ethyl acetate after decolorizing the solution with decolorizing charcoal. There was obtained 2.2 grams of methyl 3-acetoxy-11-keto-3,5,17(20) - [cis] - pregnatrien-21-oate melting at 150 to 170 degrees centigrade, having an $\epsilon_{238}$ of 28,850 and an infrared spectrum consistent with the structure.

Methyl 3-11 - diketo - 4,17(20) - [cis] - pregnadien-21-oate can be prepared according to the method disclosed in U.S. Patent 2,707,184. This compound is converted to the corresponding methyl 3,11 - diketo-4,17(20)-[trans]-pregnadien-21-oate by refluxing in methanol containing sodium methoxide. The other alkyl 3,11-diketo-4,17(20)-pregnadien-21-oates are similarly prepared.

PREPARATION 2

*Methyl-3,11-diketo-6-bromo-4,17(20)-[cis]-pregnadien-21-oate*

To a solution of 2.1 grams (5.4 millimoles) of methyl 3-acetoxy - 11 - keto - 3,5,17(20)-[cis]-pregnatrien-21-oate in eighty milliliters of acetone cooled in a cold water bath was added dropwise a solution of 2.2 grams of N-bromo-acetamide, two grams of sodium acetate trihydrate and 2.2 milliliters of glacial acetic acid in forty milliliters of water. A precipitate of starting material formed and an additional 150 milliliters of acetone was added. The solution was stirred at room temperature for three hours. The acetone was removed by distillation at reduced pressure. The concentrate was diluted with ether and the ether solution was washed with an aqueous sodium bicarbonate solution and then with water. The washed solution was dried, filtered, and the filtrate distilled to dryness. The residue consisted of methyl 3,11-diketo-6-bromo-4,17(20)-[cis]-pregnadien-21-oate which melted at 133 to 140 degrees centigrade with decomposition, had an $\epsilon_{231.5}$ of 20,300 and the analysis below:

Calculated for $C_{22}H_{27}O_4Br$: Br, 18.50. Found: Br, 18.91.

PREPARATION 3

*Methyl 3,11-diketo-4,6,17(20)-[cis]-pregnatrien-21-oate*

The methyl 3,11-diketo-6-bromo-4,17(20)-[cis]-pregnadien-21-oate (20 grams) obtained according to the method described in Preparation 2 was heated in 250 milliliters of refluxing collidine under a slow stream of nitrogen for 45 minutes. The mixture was cooled and the precipitated collidine hydrobromide was removed by filtration. The filtrate was made slightly acidic with 6 N hydrochloric acid and extracted with methylene chloride. The extract was washed with dilute hydrochloric acid, water, dilute sodium hydroxide and again with water until the washings were neutral. The washed extract was dried and filtered through a bed of Florisil synthetic magnesium silicate. The filtrate was concentrated to dryness and the residue triturated with ether. The insoluble material was crystallized from methanol to give 13.6 grams of methyl 3,11 - diketo-4,6,17(20)-[cis]-pregnatrien-21-oate melting at 180 to 182 degrees centigrade. An analytical sample, obtained by recrystallization of the methyl 3,11-diketo-4,6,17(20)-[cis]-pregnatrien-21-oate from acetone, melted at 183 to 185 degrees centigrade, had an $[\alpha]_D$ of plus 228 degrees in acetone, an $\epsilon_{223}$ of 14,050 and an $\epsilon_{282}$ of 23,075. The ether and methanol mother liquors were combined and distilled to dryness. The residue was dissolved in benzene and poured over a column of 200 grams of Florisil. The column was developed with Skellysolve B containing increasing amounts of acetone. The Skellysolve B plus nine percent acetone to the Skellysolve B plus thirteen percent acetone eluates contained the desired product.

The eluted product consisted of a different crystalline form of the methyl 3,11-diketo-4,6,17(20)-[cis]-pregnatrien-21-oate which melted at 170 to 174 degrees centigrade. A mixture of the two forms melted at 183 to 185 degrees centigrade. This material analyzes as a solvate of acetone. After drying the product at 100 degrees centigrade for several days, the molecule of acetone was lost and the product had the analysis below:

Calculated for $C_{22}H_{26}O_4$: C, 74.55; H, 7.39. Found: C, 74.53; H, 7.12.

PREPARATION 4

*Methyl 3,7-dipyrrolidyl-3,5,17(20)-[cis]-pregnatrien-21-oate*

A solution of 19.0 grams (0.055 mole) of methyl 3,11-diketo-4,6,17(20)-[cis]-pregnatrien-21-oate and fifty milligrams of para-toluenesulfonic acid in a mixture of 69 milliliters of methylene chloride and nineteen milliliters of pyrrolidine were maintained at room temperature under nitrogen for forty minutes. The mixture was distilled to dryness at reduced pressure and the residue was slurried with a small amount of methanol and the methanol distilled at reduced pressure. A small amount of ether was added which was also distilled at reduced pressure. The product was dried under high vacuum for about three hours. The thus-produced methyl 3,7-dipyrrolidyl - 3,5,17(20) - [cis] - pregnatrien-21-oate had an ultraviolet absorption maximum at 324 m$\mu$ in methanol.

PREPARATION 5

*3,7-dipyrrolidyl-11β,21-dihydroxy-3,5,17(20)-pregnatriene*

The methyl 3,7-dipyrrolidyl-3,5,17(20) - [cis] - pregnatrien-21-oate obtained according to the method of Preparation 4 was dissolved in about one liter of dry ether and nine grams of lithium aluminum hydride was added thereto. The solution was stirred for 75 minutes and then sixty milliliters of ethyl acetate was slowly added to decompose the excess lithium aluminum hydride, followed by sixty milliliters of water. Heat was evolved bringing the solution to its boiling point. The thus-volatilized solvent was distilled from the mixture. There was thus-produced a concentrated solution containing 3,7-dipyrrolidyl-11β,21-dihydroxy-3,5,17(20)-[cis]-pregnatriene which can be isolated by separating the ether, drying the solution with anhydrous magnesium sulfate and then distilling the dried solution to dryness.

PREPARATION 6

*11β,21-dihydroxy-4,6,17(20)-[cis]-pregnatrien-3-one*

The ether solution of 3,7-dipyrrolidyl-11β,21-dihydroxy-3,5,17(20)-[cis]-pregnatriene obtained according to the method of Preparation 5 was mixed with 400 milliliters of methanol and forty milliliters of ten percent aqueous sodium hydroxide. The mixture was maintained at forty degrees centigrade for about fifteen minutes and 25 milliliters of acetic acid was then added. After about one hour the solution was made acidic with dilute hydrochloric acid and extracted with methylene chloride. The extract was washed with dilute sodium hydroxide and water and then dried, filtered and distilled to dryness. The residue consisted of 11β,21-dihydroxy-4,6,17(20) - [cis] - pregnatrien-3-one.

PREPARATION 7

*11β-hydroxy-21-acetoxy-4,6,17(20)-[cis]-pregnatrien-3-one*

The 11β,21 - dihydroxy-4,6,17(20)-[cis]-pregnatrien-3-one obtained according to the method of Preparation 6 was dissolved in twenty milliliters of pyridine and fifteen milliliters of acetic anhydride and the mixture heated at forty degrees centigrade for four hours. The solution was cooled and then slowly diluted with water. The 10.4 grams of precipitated steroid was removed by filtration, washed with water and dried. After crystallization from acetone the 11β-hydroxy-21-acetoxy - 4,6,17(20) - [cis]-pregnatrien-3-one melted at 177 to 181 degrees centigrade. A recrystallized sample melted at 180 to 182 degrees centigrade, had an $[\alpha]_D$ of plus 105 degrees in acetone and an $\epsilon_{286}$ of 26,350.

Calculated for $C_{23}H_{30}O_4$: C, 74.58; H, 8.16. Found: C, 74.88; H, 8.22.

Similarly, 11β,21-dihydroxy-4,6,17(20)-[cis]-pregnatrien-3-one is converted to other 11β-hydroxy-21-acyloxy-4,6,17(20)-[cis]-pregnatrien-3-ones by esterification of the 21-hydroxy group, e.g., by reaction with the appropriate acid anhydride, acid chloride or bromide, ester by ester exchange, acid in the presence of an esterification catalyst, etc. Examples of 11β-hydroxy-21-acyloxy-4,6,17(20)-[cis]-pregnatrien-3-ones thus-prepared include those wherein the acyl group is the acyl radical of, for example, a lower-aliphatic acid, e.g., formic, propionic, butyric, isobutyric, valeric, isovaleric, trimethylacetic, 3-ethylbutyric, hexanoic, heptanoic, octanoic, a cyclic acid, e.g., 3β-hydroxycholanic, 3β-hydroxyetiocholanic, a cycloaliphatic acid, e.g., β-cyclopentylpropionic, an aryl or alkaryl acid, e.g., benzoic, 2, 3, or 4-methylbenzoic, ethylbenzoic, 2,4,6-trimethylbenzoic, α-naphthoic, 3-methyl-α-naphthoic, an aralkyl acid, e.g., phenylacetic, phenylpropionic, diphenylacetic, a dibasic acid (which can be converted to water soluble, e.g., sodium, salts), e.g., succinic, glutaric, pimelic, suberic, a hydroxy acid, e.g., glycolic, lactic, citric, tartaric, d-maleic, salicylic, an aminoacid, e.g., glycine, methylglycine, para-aminosalicylic, para-aminobenzoic, other hetero-substituted acids, e.g., ethylmercaptoacetic, cyanoacetic, chloroacetic, fluoroacetic, trichloroacetic, trifluoroacetic, thioglycolic, or a heterocyclic acid, e.g., β-furylcarboxylic, α-picolinic, nicotinic, or other acyl acid.

Example 1

*Sodium enolate of 2-ethoxyoxalyl-11β,21-dihydroxy-4,6,17(20)-[cis]-pregnatriene-3-one*

A solution of one gram of 11β-hydroxy-21-acetoxy-4,6,17(20)-[cis]-pregnatrien-3-one in sixteen milliliters of tertiary butyl alcohol was heated to 63 degrees centigrade. Thereto was added 0.8 milliliter of ethyl oxalate and 0.9 milliliter of a 25 percent sodium methoxide-methanol solution in a nitrogen atmosphere and with stirring. A precipitate began to form before all of the sodium methoxide solution was added. The reaction mixture was thereupon cooled to thirty degrees centigrade and eighteen milliliters of absolute ether was added. The mixture was thereupon stirred for forty minutes, then filtered, the precipitate collected and washed thoroughly with dry ether. The thus obtained sodium enolate of 2-ethoxyoxalyl-11β,21-dihydroxy-4,6,17(20)-[cis]-pregnatrien-3-one weighed 1.15 grams (100 percent yield) and gave a dark brown color with Ferric chloride in aqueous methanol. The ultra-violet spectra of the sodium enolate of 2-ethoxyoxalyl-11β,21-dihydroxy-4,6,17(20)-[cis]-pregnatrien-3-one was as follows:

Alcohol $\epsilon_{287}=12,225$; $\epsilon_{370}=7,025$
In 0.01 N alc. $H_2SO_4$ $\epsilon_{298}=9,375$; $\epsilon_{350}=8,175$
In 0.01 N alc. KOH $\epsilon_{287}=14,975$; $\epsilon_{382}=7,000$

Example 2

*Potassium enolate of 2-methoxyoxalyl-11β,21-dihydroxy-4,6,17(20)-[cis]-pregnatrien-3-one 21-acetate*

A solution was prepared containing one gram of 11β-hydroxy-21-acetoxy-4,6,17(20)-[cis]-pregnatrien-3-one in 25 milliliters of benzene. This solution was heated to the reflux temperature of about eighty degrees and thereto was added 0.8 milliliter of methyl oxalate and 0.25 gram of potassium hydride suspended in five milliliters of benzene. The mixture was refluxed under stirring for a period of two hours and then cooled, filtered, and the precipitate collected. The thus obtained precipitate was washed with three 25-milliliter portions of benzene and dried to give the potassium enolate of 2-methoxy-oxalyl-11β-hydroxy-21-acetoxy-4,6,17(20)-[cis]-pregnatrien-3-one.

Example 3

(a) Refluxing 11β,21-dihydroxy-4,6,17(20)-[cis]-pregnatrien-3-one 21-propionate, dissolved in benzene, with methyloxalate in the presence of sodium methoxide produced the sodium enolate of 2-methoxyoxalyl-11β,21-dihydroxy-4,6,17(20)-[cis]-pregnatrien-3-one 21-propionate.

(b) Treating 11β,21-dihydroxy-4,6,17(20)-[cis]-pregnatrien-3-one 21-benzoate, dissolved in tertiary butyl alcohol, with ethyl oxalate in the presence of potassium ethoxide produced the potassium enolate of 2-ethoxyoxalyl-11β,21-dihydroxy-4,6,17(20)-[cis]-pregnatrien-3-one 21-benzoate.

(c) Treating 11β,21-dihydroxy-4,6,17(20)-[cis]-pregnatrien-3-one 21-phenylacetate, dissolved in benzene, with butyl oxalate in the presence of lithium butoxide yielded the lithium enolate of 2-butoxyoxalyl-11β,21-dihydroxy-4,6,17(20)-[cis]-pregnatrien-3-one 21-phenylacetate.

(d) Reacting 11β,21-dihydroxy-4,6,17(20)-[cis]-pregnatrien-3-one 21-trimethylacetate, dissolved in benzene, with ethyl oxalate in the presence of potassium ethoxide yielded a potassium enolate of 2-ethoxyoxalyl-11β,21-dihydroxy-4,6,17(20)-[cis]-pregnatrien-3-one 21-trimethylacetate.

(e) Treating 11β,21-dihydroxy-4,6,17(20)-[cis]-pregnatrien-3-one, dissolved in methanol, with potassium ethoxide and methyl oxalate produced the potassium enolate of 2-methoxyoxalyl-11β,21-dihydroxy-4,6,17(20)-[cis]-pregnadien-3-one.

In the same manner as shown in Examples 2 and 3, treating other 21-esters of 11β,21-dihydroxy-4,6,17(20)-[cis]-pregnatrien-3-one with a lower-alkyl oxalate in the presence of a base such as sodium, potassium or lithium methoxide, ethoxide, propoxide, butoxide, or the like, produces the corresponding alkali metal enolates of the 2-lower-alkyl-11β,21-dihydroxy-4,17(20)-[cis]-pregnadien-3-one 21-acylates. Such produced alkali metal enolates of 2-alkoxyoxalyl-11β,21-dihydroxy-4,17(20)-[cis]-pregnadien-3-one 21-acylates comprise: the sodium, potassium and lithium enolate of 2-butoxyoxalyl-11β,21-dihydroxy-4,6,17(20)-[cis]-pregnatrien-3-one 21-acetate, 2-amyloxyoxalyl-11β,21-dihydroxy-4,6,17(20)-[cis]-pregnatrien-3-one 21-acetate, 2-hexyloxyoxalyl-11β,21-dihydroxy-4,6,17(20)-[cis]-pregnatrien-3-one 21-acetate, 2-heptyloxyoxalyl-11β,21-dihydroxy-4,6,17(20)-[cis]-pregnatrien-3-one 21-acetate, 2-octyloxyoxalyl-11β,21-dihydroxy-4,6,17(20)-[cis]-pregnatrien-3-one 21-acetate; the sodium, potassium and lithium enolates of 2-methoxyoxalyl- and 2-ethoxyoxalyl-11β,21-dihydroxy-4,6,17(20)-[cis]-pregnatrien-3-one 21-acylates wherein the acylate group is valerate, isovalerate, hexanoate, heptanoate, octanoate, β-cyclopentylpropionate, phenylpropionate, anisate, dineopentylacetate, triethylacetate, salicylate, toluate, acid succinate, acid tartrate, acid maleate, chloroacetate, dichloroacetate, trichloroacetate, bromoacetate, iodoacetate, fluoroacetate, trifluoroacetate, ortho-bromobenzoate, meta-nitrobenzoate, toluenesulfonate, benzenesulfonate, or the like.

Example 4

*2-ethoxyoxalyl-2-methyl-11-β,21-dihydroxy-4,6,17(20)-[cis]-pregnatrien-3-one*

A slurry of three grams of the sodium enolate of ethoxyoxalyl-11β,21-dihydroxy-4,6,17(20)-pregnatrien-3-one, 120 milliliters of acetone, six grams of anhydrous potassium carbonate, and eighteen milliliters of methyl iodide was stirred at room temperature for a period of five days, water was then added and the reaction mixture was extracted three times with fifty milliliters of methylene chloride. The combined methylene chloride extracts were washed with brine, dried and concentrated to dryness. The yellow residue thus obtained was recrystallized from acetone-Skellysolve B hexanes to give pure 2-ethoxyoxalyl-2-methyl-11β,21-dihydroxy-4,6,17(20)-[cis]-pregnatrien-3-one 21 acetate.

Example 5

*2-methoxyoxalyl-2-methyl-11β,21-dihydroxy-4,6,17(20)-[cis]-pregnatrien-3-one 21-acetate*

A mixture of potassium enolate of 2-methoxyoxalyl-11β,21-dihydroxy-4,6,17(20)-[cis]-pregnatrien-3-one, dissolved in acetone, was reacted with methyl iodide and potassium carbonate in the manner shown in Example 4. After five days of agitation at room temperature the reaction mixture was filtered, the filtered cake washed with four portions of hot acetone and the combined acetone solution distilled to leave a residue. The thus obtained residue was recrystallized from acetone Skellysolve B-hexanes to give pure 2-methoxyoxalyl-2-methyl-11β,21-dihydroxy-4,6,17(20)-[cis]-pregnatrien-3-one 21-acetate.

EXAMPLE 6

In the manner shown in Example 5, (a) Treating the sodium enolate of 2-ethoxyoxalyl-11β,21-dihydroxy-4,6,17(20)-[cis]-pregnatrien-3-one 21-propionate with methyl iodide in the presence of sodium carbonate produced 2-ethoxyoxalyl-2-methyl-11β,21-dihydroxy-4,6,17(20)-[cis]-pregnatrien-3-one 21-propionate.

(b) Treating the potassium enolate of 2-methoxyoxalyl-11β,21-dihydroxy-4,6,17(20)-[cis]-pregnatrien-3-one 21-benzoate with methyl iodide in the presence of sodium carbonate produced 2-methoxyoxalyl-2-methyl-11β,21-dihydroxy-4,6,17(20)-[cis]-pregnatrien-3-one-21-benzoate.

(c) Treating the potassium enolate of 2-ethoxyoxalyl-11β,21-dihydroxy-4,6,17(20)-[cis]-pregnatrien-3-one 21-phenylacetate with methyl iodide in the presence of sodium carbonate produced 2-ethoxyoxalyl-2-methyl-11β,21-dihydroxy-4,6,17(20)-[cis]-pregnatrien-3-one 21-phenyl-acetate.

(d) Treating the lithium enolate of 2-butoxyoxalyl-11β,21-dihydroxy-4,6,17(20)-[cis]-pregnatrien-3-one 21-acetate with methyl iodide in the presence of sodium carbonate produced 2-butoxyoxalyl-2-methyl-11β,21-dihydroxy-4,6,17(20)-[cis]-pregnatrien-3-one 21-acetate.

(e) Treating the sodium enolate of 2-ethoxyoxalyl-11β,21-dihydroxy-4,6,17(20)-[cis]-pregnatrien-3-one with butyl bromide in the presence of potassium carbonate produced 2-ethoxyoxalyl-2-butyl-11β,21-dihydroxy-4,6,17(20)-[cis]-pregnatrien-3-one.

(f) Treating the sodium enolate of 2-ethoxyoxalyl-11β,21-dihydroxy-4,6,17(20)-[cis]-pregnadien-3-one 21-acetate with ethyl iodide in the presence of potassium carbonate produced 2-ethoxyoxalyl-2-ethyl-11β,21-dihydroxy-4,6,17(20)-[cis]-pregnatrien-3-one 21-acetate.

(g) Treating the sodium enolate of 2-ethoxyoxalyl-11β,21-dihydroxy-4,6,17(20)-[cis]-pregnatrien-3-one 21-acetate with propyl iodide in the presence of potassium carbonate produced 2-ethoxyoxalyl-2-propyl-11β,21-dihydroxy-4,6,17(20)-[cis]-pregnatrien-3-one 21-acetate.

(h) Treating the sodium enolate of 2-ethoxyoxalyl-11β,21-dihydroxy-4,6,17(20)-[cis]-pregnatrien-3-one 21-acetate with pentyl iodide in the presence of potassium carbonate produced 2-ethoxyoxalyl-2-pentyl-11β,21-dihydroxy-4,6,17(20)-[cis]-pregnatrien-3-one 21-acetate.

(i) Treating the sodium enolate of 2-ethoxyoxalyl-11β,21-dihydroxy-4,6,17(20)-[cis]-pregnatrien-3-one 21-acetate with hexyl chloride in the presence of potassium carbonate produced 2-ethoxyoxalyl-2-hexyl-11β,21-dihydroxy-4,6,17(20)-[cis]-pregnatrien-3-one 21-acetate.

(j) Treating the sodium enolate of 2-ethoxyoxalyl-11β,21-dihydroxy-4,6,17(20)-[cis]-pregnatrien-3-one 21-acetate with heptyl iodide in the presence of potassium carbonate produced 2-ethoxyoxalyl-2-heptyl-11β,21-dihydroxy-4,6,17(20)-[cis]-pregnatrien-3-one 21-acetate.

(k) Treating the sodium enolate of 2-ethoxyoxalyl-11β,21-dihydroxy-4,6,17(20)-pregnatrien-3-one 21-acetate with octyl iodide in the presence of potassium carbonate produced 2-ethoxyoxalyl-2-octyl-11β,21-dihydroxy-4,6,17(20)-[cis]-pregnatrien-3-one 21-acetate.

(l) Treating the sodium enolate of 2-ethoxyoxalyl-11β,21-dihydroxy-4,6,17(20)-[cis]-pregnatrien-3-one 21-acetate with benzyl iodide in the presence of potassium carbonate produced 2-ethoxyoxalyl-2-benzyl-11β,21-dihydroxy-4,6,17(20)-[cis]-pregnatrien-3-one 21-acetate.

(m) Treating the sodium enolate of 2-ethoxyoxalyl-11β,21-dihydroxy-4,6,17(20)-[cis]-pregnatrien-3-one 21-acetate with phenyl iodide in the presence of potassium carbonate produced 2-ethoxyoxalyl-2-phenyl-11β,21-dihydroxy-4,6,17(20)-[cis]-pregnatrien-3-one 21-acetate.

In the same manner as shown in Examples 4 thru 6, treating an alkali metal enolate of a 2-lower-alkyloxyoxalyl - 11β,21 - dihydroxy-4,6,17(20)-[cis]-pregnatrien-3-one 21-acylates with a lower-alkyl halide preferably a lower-alkyl halide wherein the alkyl group has from one to eight carbon atoms and the halogen an atomic weight between 34 and 130, preferably in the presence of a catalyst such as sodium or potassium carbonate, produces the corresponding 2-lower-alkoxyoxalyl-2-alkyl - 11β,21-dihydroxy - 4,6,17(20)-[cis]-pregnatrien - 3 - one 21-acylates, illustratively those 2-lower-alkoxyoxalyl-2-alkyl-11β,21-dihydroxy-4,6,17(20)-[cis]-pregnatrien-3-one 21-acylates wherein the alkoxy group is methoxy, ethoxy, propoxy, butoxy, pentoxy, hexoxy, heptoxy, octoxy, or the like, the alkyl group is methyl, ethyl, propyl, pentyl, hexyl, heptyl, octyl, benzyl, phenyl, or the like, and the acyl group of the acylate is acetyl, propionayl, butyryl, valeryl, isovaleryl, hexanoyl, heptanoyl, octanoyl, benzoyl, toluenesulfonyl, anisoyl, gallyl, toluyl, chloroacetyl, dichloroacetyl, or the like.

EXAMPLE 7

*2-methyl-11β,21-dihydroxy-4,6,17(20)-[cis]-pregnatrien-3-one*

A solution was prepared containing 2.5 grams of 2-ethoxyoxalyl - 2 - methyl - 11β,21 - dihydroxy-4,6,17(20)-[cis]-pregnatrien-3-one, dissolved in 75 milliliters of methanol. To the solution was added three milliliters of 25 percent sodium methoxide and the mixture was stirred for a period of two hours and twenty minutes in a nitrogen atmosphere. The solution was thereupon diluted with water and extracted with three 50-milliliter portions of methylene chloride. The extracts were washed with water until neutral to phenolphthalein, dried over anhydrous sodium sulfate and evaporated to give a residue. This residue was crude 2-methyl-11β,21-dihydroxy-4,6,17(20)-[cis]-pregnatrien-3-one.

The thus obtained 2-methyl - 11β,21 - dihydroxy-4,6,17(20)-[cis]-pregnatrien-3-one was dissolved in ten milliliters of pyridine and five milliliters of acetic anhydride. After standing overnight at room temperature (about 20–25 degrees centigrade) the solution was diluted dropwise with water and extracted with ether. The extracts were washed with aqueous sodium bicarbonate and water, dried over anhydrous sodium sulfate and evaporated. The thus obtained residue, 2.1 grams, was a yellow glassy solid. This product was chromatographed through 50 grams of Florisil collecting fractions of 150 milliliters as follows in Table I:

TABLE I

| Fraction No. | Solvent |
| --- | --- |
| 1 | Skellysolve B-hexane-methylene chloride 1:1. |
| 2 | Skellysolve B-hexane-methylene chloride 1:1. |
| 3–5 | Acetone-Skellysolve B 5:95. |
| 6–10 | Acetone-Skellysolve B 8:92. |
| 11–17 | Acetone-Skellysolve B 18:82. |
| 18–20 | Acetone-Skellysolve B 30:70. |
| 21 | Acetone. |
| 22 | Acetone. |

Fractions 6 through 17, inclusive, were combined, evaporated and rechromatographed over thirty grams of Florisil synthetic magnesium silicate using fractions as follows in Table II.

TABLE II

| Fraction | Volume of Fraction, milliliters | Solvent |
| --- | --- | --- |
| 1–4 | 100 | Skellysolve B hexanes. |
| 5–6 | 100 | Acetone-Skellysolve B 2:98. |
| 7–9 | 100 | Acetone-Skellysolve B 4:96. |
| 10–17 | 100 | Acetone-Skellysolve B 6:94. |
| 18–22 | 100 | Acetone-Skellysolve B 8:92. |
| 23–24 | 100 | Acetone-Skellysolve B 10:90. |
| 25–26 | 250 | Acetone-Skellysolve B 14:86. |
| 27–28 | 250 | Acetone-Skellysolve B 20:80. |
| 29–31 | 250 | Acetone. |

Fractions 11 through 15 were combined and evaporated to give 2-methyl - 11β - hydroxy-4,6,17(20)-[cis]-pregnatrien-3-one 21-acetate which resisted crystallization and showed an ultra-violet absorption spectra at 283 Mμ, $\epsilon = 22{,}925$ and rotation $[\alpha]_D$ of plus 150 degrees in chloroform.

EXAMPLE 8

*2-methyl-11β,21-dihydroxy-4,6,17(20)-[cis]-pregnatrien-3-one*

In the manner shown in Example 7, treating 2-ethoxyoxalyl - 2 - methyl-11β,21-dihydroxy - 4,6,17(20)-pregnatrien-3-one 21-propionate with potassium ethoxide in ethanol solution resulted in 2-methyl-11β,21-dihydroxy-4,6, 17(20)-[cis]-pregnatrien-3-one.

Hydrolyzing in the manner shown in Examples 7 and 8, the 2-methoxyoxalyl - 2 - methyl - 11β,21 - dihydroxy-4,6, 17(20)-[cis]-pregnatrien-3-one 21-benzoate, 2-ethoxyoxalyl-2-methyl-11β,21-dihydroxy - 4,6,17(20)-[cis]-pregnatrien-3-one 21-phenylacetate and the 2-butoxyoxalyl-2-methyl - 11β,21 - dihydroxy-4,6,17(20)-[cis]-pregnatrien-3-one 21-acetate with sodium ethoxide or sodium methoxide in methanol or ethanol solution or with other bases such as sodium carbonate, sodium bicarbonate, potassium carbonate, or the like in aqueous alcoholic solution yielded 2-methyl-11β,21-dihydroxy-4,6,17(20)-[cis]-pregnatrien-3-one.

EXAMPLE 9

Hydrolyzing in the manner shown in Example 5 with potassium methoxide in ethanol:

(a) 2-ethoxyoxalyl - 2 - butyl - 11β,21 - dihydroxy-4,6, 17(20)-[cis]-pregnatrien-3-one yielded 2-butyl-11β,21-dihydroxy-4,6,17(20)-[cis]-pregnatrien-3-one;

(b) 2-ethoxyoxalyl - 2 - ethyl - 11β,21 - dihydroxy-4,6, 17(20)-[cis]-pregnatrien-3-one 21-acetate yielded 2-ethyl-11β,21-dihydroxy-4,6,17(20)-[cis]-pregnatrien-3-one;

(c) 2-ethoxyoxalyl - 2 - propyl - 11β,21 - dihydroxy-4,6,17(20)-[cis]-pregnatrien-3-one yielded 2-propyl-11β, 21-dihydroxy-4,6,17(20)-[cis]-pregnatrien-3-one.

(d) 2-ethoxyoxalyl - 2 - pentyl - 11β,21 - dihydroxy-4,6,17(20)-[cis]-pregnatrien-3-one 21-acetate yielded 2-pentyl - 11β,21 - dihydroxy-4,6,17(20)-[cis]-pregnatrien-3-one.

(e) 2-ethoxyoxalyl - 2 - hexyl - 11β,21 - dihydroxy-4,6, 17(20)-[cis]-pregnatrien-3-one 21-acetate yielded 2-hexyl-11β,21-dihydroxy-4,6,17(20)-[cis]-pregnatrien-3-one.

(f) 2-ethoxyoxalyl - 2 - heptyl - 11β,21 - dihydroxy-4,6, 17(20)-[cis]-pregnatrien-3-one 21-acetate yielded 2-heptyl-11β,21-dihydroxy-4,6,17(20)-[cis]-pregnatrien-3-one.

(g) 2-ethoxyoxalyl - 2 - octyl - 11β,21 - dihydroxy-4,6, 17(20)-[cis]-pregnatrien-3-one 21-acetate yielded 2-octyl-11β,21-dihydroxy-4,6,17(20)-[cis]-pregnatrien-3-one.

(h) 2-ethoxyoxalyl - 2 - benzyl - 11β,21 - dihydroxy-4,6,17(20)-pregnatrien-3-one 21-acetate yielded 2-benzyl-11β,21-dihydroxy-4,6,17(20)-[cis]-pregnatrien-3-one.

(i) 2-ethoxyoxalyl - 2 - phenyl - 11β,21 - dihydroxy-4,6,17(20)-[cis]-pregnatrien-3-one 21-acetate yielded 2-phenyl - 11β,21 - dihydroxy-4,6,17(20)-[cis]-pregnatrien-3-one.

In the same manner as shown in Example 7, the 21-alcohols of 2-lower-alkyl-11β,21-dihydroxy-4,6,17(20)-[cis]-pregnatrien-3-one of Examples 7, 8, and 9 can be esterified to give the corresponding 21-esters. Esterification is usually carried out in the manner shown in Example 7, using a solvent such as pyridine or a neutral solvent such as ether, benzene, toluene, or the like, and an esterification reagent such as an anhydride or a chloride or bromide of an organic carboxylic acid respectively of a hydrocarbon carboxylic acid. The anhydrides and halides of organic carboxylic acids or hydrocarbon carboxylic acids useful in the esterification comprise those from one to eight carbon atoms in particular, but those containing up to twelve carbon atoms such as, for example, lauryl, undecylenyl or dineopentylacetyl bromide or chloride are also utilizable. The thus obtained 2-lower-alkyl-11β,21-dihydroxy-4,6,17(20)-[cis]-pregnatrien-3-ones 21-acylates comprise the 21-acetate, propionate, cyclopentylpropionate, butyrate, isobutyrate, valerate, isovalerate, hexanoate, heptanoate, octanoate, phenylacetate, benzoate, toluate, trimethylacetate, dineopentylacetate, triethylacetate, chloro-, bromo- and iodo- or fluoroacetate, trichloro- and trifluoroacetate, toluene-sulfonate, benzenesulfonate, nicotinate, 2-furoate, and other acid esters of 2-lower-alkyl - 11β,21 - dihydroxy - 4,6,17(20) - [cis] - pregnatrien-3-one wherein the lower-alkyl group comprises methyl, ethyl, propyl, isopropyl, butyl, isobutyl, pentyl, hexyl, octyl, phenyl, benzyl, or the like.

EXAMPLE 10

*2-methyl-11β,21-dihydroxy-4,6,17(20)-[cis]-pregnatrien-3-one*

A solution containing 0.55 gram of 2-methyl-11β-hydroxy-21-acetoxy-4,6,17(20)-[cis]-pregnatrien-3-one, 15 milliliters of five percent potassium carbonate in 80 percent methanol was heated in a nitrogen atmosphere at reflux for a period of two and one half hours. The reaction mixture was diluted with water and extracted with methylene chloride. The extracts were washed with water and dried. The solvent was removed and the residue crystallized from ethyl acetate to yield 0.3 gram of 2-methyl - 11β,21 - dihydroxy - 4,6,17(20) - [cis] - pregnatrien-3-one of melting point 147 to 155 degrees centigrade and $$\lambda_{max.}^{EtOH}\ 283\ m\mu,\ \epsilon = 24{,}450$$

*Anal.*—Calcd. for $C_{22}H_{30}O_3 + \frac{1}{2}$ mole of ethyl acetate: C, 74.57; H, 8.86. Found: C, 74.52; H, 8.78 8.90.

EXAMPLE 11

*2-methyl-11β,17α,21-trihydroxy-4,6-pregnadien-3,20-dione 21-acetate*

A solution was prepared containing 230 milligrams of 2 - methyl - 11β,21 - dihydroxy - 4,6,17(20) - [cis] - pregnatrien-3-one 21-acetate, 13-milliliters of tertiary butyl-alcohol, 0.15 milliliter of pyridine, one milliliter of N-methylmorpholine oxide peroxide (4.4 N in respect to thiosulfate solution) and 0.45 milligram of osmium tetroxide in 0.1 milliliter of tertiary butyl alcohol. The thus prepared solution was allowed to stand at room temperature for a period of 24 hours and thereafter was diluted with water and extracted with methylene chloride. The combined extracts were washed with dilute hydrochloric acid, dilute sodium bicarbonate and water, dried and concentrated to dryness. The residue was chromatographed through 15 grams of Florisil taking fractions as shown in Table III.

TABLE III

| Fraction | Volume of Fraction, milliliters | Solvent |
| --- | --- | --- |
| 1-3 | 100 | Skellysolve B hexanes. |
| 4-6 | 100 | Acetone-Skellysolve B 2:98. |
| 7-9 | 100 | Acetone-Skellysolve B 4:96. |
| 10-11 | 100 | Acetone-Skellysolve B 6:94. |
| 12-14 | 100 | Acetone-Skellysolve B 10:90. |
| 15-20 | 100 | Acetone-Skellysolve B 12:88. |
| 21-22 | 100 | Acetone-Skellysolve B 14:86. |
| 23-25 | 150 | Acetone-Skellysolve B 20:80. |
| 26-27 | 150 | Acetone-Skellysolve B 50:50. |
| 28-29 | | Acetone. |

Fractions 15 to 18 were combined, dried, and evaporated and the thus obtained residue recrystallized from ethyl acetate ether. The thus obtained 2-methyl-11β,17α,21-trihydroxy-4,6-pregnadien-3,20-dione 21-acetate had a melting point of 211 to 216 degrees centigrade, and an ultraviolet absorption, $\epsilon_{284} = 23{,}425$. The infrared spectrum indicated that the product is solvated. Otherwise, the proposed structure is in agreement with the spectrum.

*Anal.*—Calcd. for $C_{24}H_{33}O_6 \cdot \frac{1}{2}$ mole EtOAc: C, 68.10; H, 7.47. Found: C, 68.21; H, 8.25.

The solvated 2-methyl-11β,17α,21-trihydroxy-4,6-pregnadiene-3,20-dione 21-acetate was heated to 100 degrees centigrade over phosphorus pentoxide for a period of eighteen hours to give pure 2-methyl-11β,17α,21-trihydroxy-4,6-pregnadiene-3,20-dione 21-acetate.

EXAMPLE 12

In the same manner as shown in Example 11, treating with N-methylmorpholine oxide peroxide and osmium tetroxide in tertiary butyl alcohol in the presence of pyridine:

(a) 2 - methyl - 11β,21 - dihydroxy - 4,6,17(20) - [cis]-pregnatrien-3-one 21-acetate yielded 2-methyl-11β,17α,21-trihydroxy-4,6-pregnadiene-3,20-dione 21-acetate.

(b) 2 - ethyl - 11β,21 - dihydroxy - 4,6,17(20) - [cis]-pregnatrien-3-one 21-acetate yielded 2-ethyl-11β,17α,21-trihydroxy-4,6-pregnadiene-3,20-dione 21-acetate.

(c) 2 - propyl - 11β,21 - dihydroxy - 4,6,17(20) - [cis]-pregnatrien-3-one 21-acetate yielded 2-propyl-11β,17α,21-trihydroxy-4,6-pregnadiene-3,20-dione 2-acetate.

(d) 2 - isopropyl - 11β,21 - dihydroxy - 4,6,17(20)-[cis]-pregnatrien-3-one 21-acetate yielded 2-isopropyl-11β,17α,21-trihydroxy-4,6-pregnadiene-3,20-dione 21-acetate.

(e) 2 - butyl - 11β,21 - dihydroxy - 4,6,17(20) - [cis]-pregnatrien-3-one 21-acetate yielded 2-butyl-11β,17α,21-trihydroxy-4,6-pregnadiene-3,20-dione 21-acetate.

(f) 2 - pentyl - 11β,21 - dihydroxy - 4,6,17(20) - [cis]-pregnatrien-3-one 21-acetate yielded 2-pentyl-11β,17α,21-trihydroxy-4,6-pregnadiene-3,20-dione 2-acetate.

(g) 2 - hexyl - 11β,21 - dihydroxy - 4,6,17(20) - [cis]-pregnatrien-3-one 21-acetate yielded 2-hexyl-11β,17α,21-trihydroxy-4,6-pregnadiene-3,20-dione 2-acetate.

(h) 2 - heptyl - 11β,21 - dihydroxy - 4,6,17(20) - [cis]-pregnatrien-3-one 21-acetate yielded 2-heptyl-11β,17α,21-trihydroxy-4,6-pregnadiene-3,20-dione 2-acetate.

(i) 2 - octyl - 11β,21 - dihydroxy - 4,6,17(20) - [cis]-pregnatrien-3-one 21-acetate yielded 2-octyl-11β,17α,21-trihydroxy-4,6-pregnadiene-3,20-dione 21-acetate.

(j) 2 - benzyl - 11β,21 - dihydroxy - 4,6,17(20) - [cis]-pregnatrien-3-one 21-acetate yielded 2-benzyl-11β,17α,21-trihydroxy-4,61-pregnadiene-3,20-dione 21-acetate.

(k) 2 - phenyl - 11β,21-dihydroxy-4,6,17(20)-[cis]-pregnatrien-3-one 21-acetate yielded 2-phenyl-11β,17α,21-trihydroxy-4,6-pregnadiene-3,20-dione 21-acetate.

(l) 2 - methyl - 11β,21-dihydroxy-4,6,17(20)-[cis]-pregnatrien-3-one 21-propionate yielded 2-methyl-11β,17α,21 - trihydroxy-4,6-pregnadiene-3,20-dione 21-propionate.

(m) 2 - methyl - 11β,21-dihydroxy-4,6,17(20)-[cis]-pregnatrien-3-one 21-benzoate yielded 2-methyl-11β,17α,21-trihydroxy-4,6-pregnadiene-3,20-dione 21-benzoate.

(n) 2 - methyl - 11β,21-dihydroxy-4,6,17(20)-[cis]-pregnatrien-3-one 21-phenylacetate yielded 2-methyl-11β,17α,21-trihydroxy-4,6-pregnadiene-3,20-dione 21-phenylacetate.

(o) 2 - methyl - 11β,21-dihydroxy-4,6,17(20)-[cis]-pregnatrien-3-one 21-trimethylacetate yielded 2-methyl-11β,17α,21 - trihydroxy - 4,6-pregnadiene-3,20-dione 21-trimethylacetate.

In the same manner as shown in Example 12, other 2 - lower-alkyl-11β,21-dihydroxy-4,6,17(20)-pregnatrien-3-ones may be treated with osmium tetroxide in tertiary butyl alcohol in the presence of pyridine to give the corresponding 2 - lower-alkyl-11β,17α,21-trihydroxy-4,6-pregnadiene-3,20-dione 21-acylates. Thus obtained acylates include the 2 - methyl-11β,17α,21-trihydroxy-4,6-pregnadiene-3,20-dione 21-acylates wherein the 21-acylate is butyrate, isobutyrate, valerate, isovalerate, hexanoate, heptanoate, octanoate, phenylpropionate, toluate, cinnamate, lactate, acid tartrate, dihydrogencitrate, chloroacetate, bromoacetate, fluoroacetate, iodoacetate, dichloroacetate, dineopentylacetate, triethylacetate, or the like.

EXAMPLE 13

*2 - methyl - 17α,21-dihydroxy-4,6-pregnadiene-3,11,20-trione 21-acetate*

A solution of 450 milligrams of 2-methyl-11β,17α,21-trihydroxy-4,6-pregnadiene-3,20-dione 21-acetate in thirty milliliters of acetone and two milliliters of water was mixed with 300 milligrams of N-bromoacetamide. After stirring for three hours the reaction mixture was poured into thirty milliliters of water containing 600 milligrams of sodium sulfite and thereafter stirred for a period of one hour. The acetone was distilled at reduced pressure and the solution was extracted with methylene chloride. Evaporation of the solvent and recrystallization yielded 2-methyl-17α,21-dihydroxy-4,6-pregnadiene-3,11,20-trione 21-acetate.

EXAMPLE 14

*2 - methyl - 17α,21-dihydroxy-4,6-pregnadiene-3,11,20-trione*

A solution containing one gram of 2-methyl-17α,21-dihydroxy-4,6-pregnadiene-3,11,20-trione 21-acetate, 25 milliliters of 95 percent alcohol and one gram of potassium carbonate was refluxed for a period of thirty minutes in a nitrogen atmosphere and thereupon poured into 100 milliliters of ice water. The mixture was then extracted with methylene chloride, the methylene chloride extracts were washed with water, dried over anhydrous sodium sulfate and evaporated to give 2-methyl-17α,21-dihydroxy-4,6-pregnadiene-3,11,20-trione. Infrared spectrum in chloroform confirmed the structure.

EXAMPLE 15

*2-methylhydrocortisone*

A solution of 1.4 grams of potassium hydroxide (reagent grade, 85 percent), dissolved in two liters of anhydrous methanol, was admixed with a slurry of two grams of five percent palladium-charcoal catalyst suspended in 800 milliliters of anhydrous methanol, in a 2.5 gallon cylindrical bottom. With vigorous stirring hydrogen was introduced at 1 to 1.5 atmosphere pressure to reduce the catalyst. Then a warm solution of 25 grams of 2 - methyl - 11β,17α,21-trihydroxy-4,6-pregnadiene-3,20-dione 21-acetate, dissolved in 950 milliliters of methanol was added. To the resulting mixture 1 to 1.1 mole equivalent of hydrogen was introduced at about 1 to 1.5 atmospheres pressure using vigorous stirring. When the selective hydrogenation was complete, the catalyst was removed by filtration and the filtrate acidified with two milliliters of acetic acid, and the solvent distilled under reduced pressure. The resulting 2-methyl-hydrocortisone was extracted with 135 milliliters of hot ethyl acetate. The insoluble potassium acetate was removed by filtration and the filtrate was allowed to cool to room temperature (25 degrees centigrade) and finally refrigerated to five to ten degrees centigrade. The crystalline product which precipitated from the filtrate, was removed by filtration and recrystallized twice from thirty-milliliter portions of ethyl acetate to give 2-methylhydrocortisone.

Treating 2-methylhydrocortisone with acetic anhydride in pyridine solution gave 2-methylhydrocortisone 21-acetate of melting point 171 to 172 degrees centigrade.

EXAMPLE 16

*2-methylcortisone*

In the same manner as shown in Example 15, 2-methyl-17α,21 - dihydroxy - 4,6 - pregnadiene-3,11,20-trione 21-acetate was reduced with hydrogen in the presence of a palladium charcoal catalyst and potassium hydroxide under the conditions shown in Example 15 to give 2-methyl - 17α,21 - dihydroxy - 4-pregnene-3,11,20-trione (2-methylcortisone).

In the same manner as in Examples 15 and 16, 2-methyl-hydrocortisone and 2-methylcortisone and other 2-lower-alkyl cortisone and hydrocortisone are prepared by hydrogenating the 6,7-double bond of the corresponding 2-lower - alkyl - 11β,17α,21-trihydroxy-6-pregnadiene-3,20-dione or 2-lower-alkyl-17α,21-dihydroxy-4,6-pregnadiene-3,11,20-trione.

Esterification of the 2-methylhydrocortisone and cortisone by standard methods, such as treating the 2-methyl steroid in pyridine solution with a halide or an anhydride of a hydrocarbon carboxylic acids gives the corresponding 21-ester of 2-methylhydrocortisone or 2-methylcortisone.

EXAMPLE 17

2 - methyl - 17α,21-dihydroxy-4,6,9(11)-pregnatriene-3, 20-dione 21-acetate (2-methyl-17α-hydroxy-21-acetoxy-4,6,9(11)-pregnatriene-3,20-dione)

A mixture of one gram of 2-methyl-11β,17α-trihydroxy-4,6-pregnadiene-3,20-dione 21-acetate, 60 milligrams of N-bromoacetamide and six milliliters of pyridine was stirred in the dark for a period of five minutes. The mixture was then cooled in an ice-water bath and a stream of sulfur dioxide was directed under the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water and dried under vacuum. After recrystallization from acetone there was obtained pure 2-methyl-17α,21-dihydroxy-4,6,9(11)-pregnatriene-3,20-dione 21-acetate. Using instead of the 21-acetate of 2-methyl-11β,17α,21-trihydroxy-4,6-pregnadiene-3,20-dione the propionate, the butyrate, the benzoate, and the like, the corresponding 2 - methyl - 17α,21-dihydroxy-4,6,9(11)-pregnatrien-3-one 21-propionate, butyrate, benzoate, and the like, is obtained.

Hydrolyzing in a nitrogen atmosphere with potassium carbonate in methanol or ethanol as shown in Example 14, 2 - methyl-17α,21-dihydroxy-4,6,9(11)-pregnatriene-3,20-dione 21-acetate produces the corresponding free alcohol, 2 - methyl - 17α,21-dihydroxy-4,6,9(11)-pregnatriene-3,20-dione.

EXAMPLE 18

In the manner shown in Example 17, treating a 2-loweralkyl - 11β,17α,21 - trihydroxy-4,6-pregnadiene-3,20-dione 21-acylate with N-bromoacetamide in pyridine solution gives the corresponding 2-lower-alkyl-11β-hypohalo-17α,21-dihydroxy-4,6-pregnadiene-3,20-dione 21-acylate which when decomposed with sulfur dioxide gave the corresponding 2 - lower-alkyl-17α,21-dihydroxy-4,6,9(11)-pregnatrien-3,20-dione 21-acylate.

Thus from:

(a) 2 - ethyl - 11β,17α,21-trihydroxy-4,6-pregnadiene-3,20-dione 21-acetate was obtained 2-ethyl-17α,21-dihydroxy-4,6,9(11)-pregnatriene-3,20-dione 21-acetate.

(b) 2 - propyl-11β,17α,21-trihydroxy-4,6-pregnadiene-3,20-dione 21-acetate was obtained 2-propyl-17α,21-dihydroxy-4,6,9(11)-pregnatriene3,20-dione 21-acetate.

(c) 2 - benzyl - 11β,17α,21 - trihydroxy - 4,6 -pregnadiene-3,20-dione 21-acetate was obtained 2-benzyl-17α,21-dihydroxy-4,6,9(11)-pregnatriene-3,20-dione 21-acetate.

(d) 2 - butyl - 11β, 17α,21 - trihydroxy - 4,6 -pregnadiene-3,20-dione 21-propionate was obtained 2-butyl-17α, 21-dihydroxy-4,6,9(11)-pregnadiene - 3,20 - dione 21-propionate.

(e) 2 - hexyl - 11β,17α,21 - trihydroxy - 4,6 - pregnadiene-3,20-dione 21-phenylpropionate was obtained 2-hexyl-17α,21 - dihydroxy - 4,6,9(11) - pregnatriene - 3,20-dione 21-phenylpropionate.

(f) 2 - octyl - 11β,17α,21 -trihydroxy - 4,6 -pregnadiene-3,20-dione 21-hexanoate was obtained 2-octyl-17α, 21-dihydroxy-4,6,9(11)-pregnatriene-3,20 - dione 21-hexanoate.

EXAMPLE 19

2-methyl-9α-bromo-11β,17α,21-trihydroxy-4,6-pregnadiene-3,20-dione 21-acetate

A solution of one gram of 2-methyl-17α,21-dihydroxy-4,6,9(11)-pregnatriene-3,20-dione 21-acetate, dissolved in forty milliliters of methylene chloride, was reacted with two milliliters of 71 percent perchloric acid in twenty milliliters of water and thereto was added 400 milligrams of N-bromoacetate in 100 milliliters of tertiary butyl alcohol. The solution was maintained at room temperature for a period of thirty minutes and then mixed with a solution of 0.50 gram of sodium sulfite in 24 milliliters of water. The mixture was distilled at reduced pressure and the residual solution became cloudy. The product was then precipitated by the addition of 200 milliliters of a mixture of ice and water. The white crystalline precipitate of 2-methyl-9α-bromo-11β,17α,21-trihydroxy-4,6-pregnadiene-3,20-dione 21-acetate was filtered, washed with water and then dried at room temperature in a vacuum. Recrystallization from a mixture of acetone and Skellysolve B gave pure 2-methyl-9α-bromo-11β,17α,21-trihydroxy-4,6-pregnadiene-3,20 - dione 21-acetate (2-methyl-9α-bromo - 11β,17α - dihydroxy - 21-acetoxy-4,6-pregnadiene-3,20-dione).

EXAMPLE 20

2-ethyl-9α-chloro-11β,17α,21-trihydroxy-4,6-pregnadiene-3,20-dione 21-acetate

A mixture of one gram of 2-ethyl-17α,21-dihydroxy-4,6,9(11)-pregnatriene-3,20-dione 21-acetate, dissolved in fifty milliliters of methylene chloride, was reacted with a solution of two milliliters of 71 percent perchloric acid in ten milliliters of water and thereto was added N-chlorosuccinimide in 100 milliliters of tertiary butyl alcohol. The solution was maintained at twenty degrees centigrade for a period of one hour and then mixed with half a gram of sodium sulfite and twelve milliliters of water. The mixture was distilled at reduced pressure and the product precipitated with the addition of excess water. The white crystalline precipitate was filtered, washed, dried and recrystallized from acetone and Skellysolve B hexanes to give 2-ethyl-9α-chloro-11β,17α,21-trihydroxy-4,6-pregnadiene-3,20-dione 21-acetate (2-ethyl-9α-chloro-11β,17α - dihydroxy - 21 - acetoxy - 4,6 - pregnadiene-3, 20-dione).

EXAMPLE 21

In the same manner as shown in Examples 19 and 20, reacting 2-lower-alkyl - 17α,21 - dihydroxy-4,6,9(11)-pregnatriene-3,20-dione 21-acylate in solution with a N-halo acid amide in the presence of acid (to produce in situ a hypohalous acid) yields the corresponding 2-lower-alkyl-9α-halo-11β,17α,21 - trihydroxy - 4,6 - pregnadiene-3,20-dione 21-acylate wherein the halogen atom in the 9α-position has an atomic weight between 34 and 130. Representative 9α-halo compounds thus obtained are: the 2-propyl - 9α - halo-11β,17α,21-trihydroxy-4,6-pregnadiene-3,20-dione 21-acetate, the 2-benzyl-9α-halo-11β,17α, 21-trihydroxy-4,6-pregnadiene-3,20-dione 21-acetate, the 2-butyl-9α-halo-11β,17α,21-trihydroxy - 4,6 - pregnadiene-3,20-dione 21-propionate, the 2-hexyl-9α-halo-11β,17α,21-trihydroxy-4,6-pregnadiene-3,20-dione 21-phenylpropionate, the 2-octyl-9α-halo-11β,17α,21-trihydroxy-4,6-pregnadiene-3,20-dione 21-octanoate wherein the halo atom is bromo, chloro, or iodo.

EXAMPLE 22

2-methyl-9α-bromo-17α,21-dihydroxy-4,6-pregnadiene-3,11,20-trione 21-acetate

A solution was prepared containing one half gram of 2-methyl-11β,17α,21-trihydroxy-4,6-pregnadiene - 3,20-dione 21-acetate, dissolved in five milliliters of glacial acetic acid. To this solution was added 0.3 gram of chromic anhydride, dissolved in two milliliters of acetic acid, and one milliliter of water. The thus obtained solution was maintained at room temperature for a period of three hours. Thereafter one milliliter of methanol was added, the solution was shaken and poured into twenty milliliters of ice water. Sodium bicarbonate solution was added to neutralize the solution and the solution was then filtered to give a crude material which was recrystallized from acetone-Skellysolve B hexanes to give 2-methyl-9α-bromo - 17α,21 - dihydroxy - 4,6 - pregnadiene-3,11,20-trione 21-acetate.

EXAMPLE 23

*2-ethyl-9α-chloro-17α,21-dihydroxy-4,6-pregnadiene-3,11,20-trione 21-acetate*

In the same manner as shown in Example 22, oxidizing 2-ethyl - 9α - chloro - 11β,17α,21 -trihydroxy - 4,6-pregnadiene-3,20-dione 21-acetate with chromic acid in acetic acid solution produces the corresponding 2-ethyl-9α-chloro-17α,21-dihydroxy-4,6-pregnadiene - 3,11,20-trione 21-acetate.

In the same manner as shown in Examples 22 and 23, other 2-lower-alkyl-17α,21-dihydroxy-4,6-pregnadiene-3, 11,20 trione 21-acylates are prepared by oxidizing the corresponding 2-lower-alkyl - 11β,17α,21 - trihydroxy-4,6-pregnadiene-3,20-dione 21-acylates. Representative compounds thus obtained comprise the 2-lower alkyl-17α,21-dihydroxy - 4,6 - pregnadiene - 3,11,20 - trione 21-acylates wherein the alkyl group is methyl, ethyl, propyl, isopropyl, butyl, isobutyl, pentyl, hexyl, heptyl, octyl, phenyl, benzyl, or the like, and wherein the acylate may be acetate, propionate, butyrate, benzoate, phenylpropionate, phenylacetate, anisate, nicotinate, or the like.

Hydrolyzing 2-methyl-9α-bromo-17α,21-dihydroxy-4,6-pregnadiene-3,11,20-trione 21-acetate with dilute (five percent) sulfuric acid in ethanol under nitrogen atmosphere produces the corresponding free diol, 2-methyl-9α-bromo-17α,21-dihydroxy-4,6-pregnadiene-3,11,20-trione.

In the same manner as shown in Example 15, hydrogenation of 2 - methyl - 9α - bromo - 17α,21 - dihydroxy-4,6-pregnadiene-3,11,20-trione 21-acetate with hydrogen and palladium charcoal catalyst in the presence of an alkali hydroxide produces 2-methyl-9α-bromo-17α,21-dihydroxy - 4 - pregnene - 3,11,20 - trione (2 - methyl - 9α-bromocortisone). Hydrogenating 2-alkylated 9α-chloro or 9α - iodo - 17α,21 - dihydroxy - 4,6 - pregnadiene-3,11,20-trione acylates in the same manner as shown in Example 15, the chloro or iodo compounds of 2-lower-alkyl cortisone can be made.

In the same manner hydrogenating 2-lower-alkyl-9α-halo 11β,17α,21 - trihydroxy - 4,6 - pregnadiene - 3,20-dione 21-acylate, dissolved in an organic solvent such as methanol, ethanol, or the like, with hydrogen and a palladium catalyst in the presence of an alkali hydroxide produces the corresponding 2-lower-alkyl-9α-halo-11β, 17α,21 - trihydroxy - 4 - pregnene - 3,20 - dione, wherein the lower alkyl group and the halo group are defined as in the preceding.

Treating 2-lower-alkyl-9α-halohydrocortisone, thus obtained with hydrocarbon carboxylic acid halides or anhydrides in pyridine solution, produces the corresponding 2 - lower - alkyl - 9α - halohydrocortisone 21 - esters, such as 2 - methyl - 9α - bromohydrocortisone 21 - acetate, 2-methyl-9α-chlorohydrocortisone 21-propionate, 2-ethyl-9α-bromohydrocortisone 21-acetate, 2-methyl-9α-chlorohydrocortisone 21-benzoate, and the like.

EXAMPLE 24

*2 - methyl - 9β,11β - epoxy - 17α,21 - dihydroxy - 4,6-pregnadiene - 3,20 - dione - 21 - acetate (2 - methyl - 9β, 11β - epoxy - 17α - hydroxy - 21 - acetoxy - 4,6 - pregnadiene-3,20-dione)*

A mixture of 0.5 gram of 2-methyl-9α-bromo-11β,17α, 21 - trihydroxy - 4,6 - pregnadiene - 3,20 - dione 21 - acetate, 0.5 gram of anhydrous potassium acetate and twenty milliliters of acetone was heated at its refluxing temperature for a period of five hours. The mixture, cooled to room temperature, was thereupon poured into water and extracted with methylene chloride. The methylene chloride extracts were dried over anhydrous sodium sulfate and then evaporated. The thus obtained residue was recrystallized from acetone and Skellysolve B three times to give 2 - methyl - 9β,11β - epoxy - 17α,21 - dihydroxy-4,6-pregnadiene-3,20-dione 21-acetate.

EXAMPLE 25

*2-ethyl-9β,11β-epoxy-17α,21-dihydroxy-4,6-pregnadiene-3,20-dione 21-acetate*

In the same manner as shown in Example 24, 2-ethyl-9α - chloro - 11β,17α,21 - trihydroxy - 4,6 - pregnadiene-3,20 - dione 21-acetate was heated with anhydrous potassium acetate in acetone solution to give 2-ethyl-9β,11β-epoxy - 17α,21 - dihydroxy - 4,6 - pregnadiene - 3,20 - dione 21-acetate.

Treating in the manner shown in Examples 24 and 25, 2 - lower - alkyl - 9α - halo - 11β,17α,21 - trihydroxy-4,6-pregnadiene-3,20-dione 21-acylates with anhydrous potassium acetate or anhydrous sodium acetate in an anhydrous solvent such as acetone, dioxane, tertiary butyl alcohol, chloroform or the like at a temperature between fifty degrees and the boiling point of the solvent produces the corresponding 2 - lower - alkyl - 9β,11β - epoxy - 17α,21-dihydroxy - 4,6 - pregnadiene - 3,20 - dione 21 - acylates. As starting compounds those 2-lower-alkyl-9α-halo-11β, 17α,21 - trihydroxy - 4,6 - pregnadiene - 3,20 - dione 21-acylates are useful in which the halo atom is of atomic weight 34 to 130, wherein the alkyl group contains from one to eight carbon atoms and wherein the acyl group of the acylate is of an organic carboxylic acid, preferably a hydrocarbon carboxylic acid containing from one to eight carbon atoms, inclusive.

EXAMPLE 26

*2 - methyl - 9α - fluoro - 11β,17α,21 - trihydroxy - 4,6-pregnadiene - 3,20 - dione 21 - acetate (2 - methyl-9α - fluoro - 11β,17α - dihydroxy - 21 - acetoxy - 4,6-pregnadiene-3,20-dione)*

One gram of 2-methyl-9β,11β-epoxy-17α,21-dihydroxy-4,6-pregnadiene-3,20-dione 21-acetate, dissolved in fifty milliliters of methylene chloride, was treated with five milliliters of 48 percent hydrofluoric acid and 0.5 milliliter of 71 percent perchloric acid at room temperature. The mixture was stirred vigorously for a period of six hours and then poured into an excess of cold aqueous five percent sodium bicarbonate solution. The methylene chloride layer was separated, dried with anhydrous sodium sulfate and thereupon evaporated to give a dry residue of 2 - methyl - 9α - fluoro - 11β,17α,21 - trihydroxy - 4,6 - pregnadiene - 3,20 - dione 21 - acetate. The material was purified by recrystallization from acetone and Skellysolve B hexanes and the thus purified 2-methyl-9α - fluoro - 11β,17α,21 - trihydroxy - 4,6 - pregnadiene-3,20-dione 21-acetate showed an infrared spectrum in chloroform identical to the one postulated for the proposed compound.

EXAMPLE 27

*2-ethyl-9α-fluoro-11β,17α,21-trihydroxy-4,6-pregnadiene-3,20-dione 21-benzoate*

In the same manner as shown in Example 26, reacting 2 - ethyl - 9β,11β - epoxy - 17α,21 - dihydroxy - 4,6-pregnadiene-3,20-dione 21-benzoate, with hydrofluoric acid in methylene chloride solution in the presence of a strong acid such as perchloric acid produced 2-ethyl-9α-fluoro - 11β,17α,21 - trihydroxy - 4,6 - pregnadiene - 3,20-dione 21-benzoate.

EXAMPLE 28

In the same manner as shown in Example 27, treating with hydrofluoric acid in methylene chloride in the presence of perchloric acid.

(a) 2 - methyl - 9β,11β - epoxy - 17α,21 - dihydroxy-4,6-pregnadiene-3,20-dione 21-propionate produced 2-methyl - 9α - fluoro - 11β,17α,21 - trihydroxy - 4,6 - pregnadiene-3,20-dione 21-propionate.

(b) 2 - propyl - 9β,11β - epoxy - 17α,21 - dihydroxy-4,6-pregnadiene-3,20-dione 21-butyrate produced 2-propyl-9α - fluoro - 11β,17α,21 - trihydroxy - 4,6 - pregnadiene-3,20-dione 21-butyrate.

(c) 2 - benzyl - 9β,11β - epoxy - 17α,21 - dihydroxy-4,6-pregnadiene-3,20-dione 21-valerate produced 2-benzyl-9α - fluoro - 11β,17α,21 - trihydroxy - 4,6 - pregnadiene-3,20-dione 21-valerate.

(d) 2 - butyl - 9β,11β - epoxy - 17α,21 - dihydroxy-4,6-pregnadiene-3,20-dione 21-propionate produced 2-butyl - 9α - fluoro - 11β,17α,21 - trihydroxy - 4,6 - pregnadiene-3,20-dione 21-propionate.

(e) 2 - hexyl - 9β,11β - epoxy - 17α,21 - dihydroxy-4,6-pregnadiene-3,20-dione 21-phenylpropionate produces 2 - hexyl - 9α - fluoro - 11β,17α,21 - trihydroxy - 4,6-pregnadiene-3,20-dione 21-phenylpropionate.

(f) 2 - octyl - 9β,11β - epoxy - 17α,21 - dihydroxy-4,6-pregnadiene-3,20-dione 21-hexanoate produces 2-octyl - 9α - fluoro - 11β,17α,21 - trihydroxy - 4,6 - pregnadiene-3,20-dione 21-hexanoate.

EXAMPLE 29

*2-methyl-9α-iodo-11β,17α,21-trihydroxy-4,6-pregnadiene-3,20-dione 21-acetate*

In the same manner as shown in Example 26, 2-methyl-9β,11β - epoxy - 17α,21 - dihydroxy - 4,6 - pregnadiene-3,20-dione 21-acetate was dissolved in methylene chloride and reacted with a solution of hydriodic acid in the presence of one percent of perchloric acid calculated on the total volume of solution to give 2-methyl-9α-iodo-11β,17α,21 - trihydroxy - 4,6 - pregnadiene - 3,20-dione 21-acetate.

In the same manner as shown in Examples 26 through 29, treating 2 - lower - alkyl - 9β,11β - epoxy - 17α,21-dihydroxy - 4,6 - pregnadiene - 3,20 - dione 21 - acylate wherein the 2-lower-alkyl group is selected from methyl, ethyl, propyl, butyl, hexyl, heptyl, octyl, phenyl, and benzyl and the like and wherein the acyl group of the acylate is selected from organic carboxylic acids, preferably hydrocarbon carboxylic acids containing from one to eight carbon atoms, inclusive, with hydrogen halide in the presence of a strong mineral acid such as perchloric, sulfuric acid or a benzenesulfonic acid, illustratively toluenesulfonic acid, produces the corresponding 2-lower-alkyl - 9α - halo - 11β,17α,21 - trihydroxy - 4,6 - pregnadiene-3,20-dione 21-acylate wherein the halogen atom has an atomic weight from 17 to 130, inclusive.

EXAMPLE 30

*2-methyl-9α-fluoro-11β,17α,21-trihydroxy-4,6-pregnadiene-3,20-dione*

One gram of 2-methyl-9α-fluoro-11β,17α,21-trihydroxy-4,6-pregnadiene-3,20-dione 21-acetate was dissolved in fifteen milliliters of methanol. Through the solution was bubbled oxygen free nitrogen for a period of ten minutes. Thereafter was added ten milliliters of methanol containing one gram of potassium carbonate and two milliliters of water. The aqueous alcoholic potassium carbonate solution had previously been purged by air by the same method, that is bubbling oxygen free nitrogen through the solution for a period of ten minutes. The thus obtained mixture is heated in a nitrogen atmosphere to reflux for a period of forty minutes and thereafter cooled and poured into 200 milliliters of cracked ice. The thus obtained solution was extracted with two 50-milliliter portions of methylene chloride. The methylene chloride extracts were dried, evaporated, and the residue was recrystallized from Skellysolve B hexanes-acetone to give pure 2-methyl-9α-fluoro-11β,17α,21-trihydroxy-4,6-pregnadiene-3,20-dione.

EXAMPLE 31

*2-methyl-9α-fluoro-17α,21-dihydroxy-4,6-pregnadiene-3,11,20-trione 21-acetate*

A mixture was prepared containing 0.5 gram of 2-methyl - 9α - fluoro - 11β,17α,21 - trihydroxy-4,6-pregnadiene-3,20-dione 21-acetate, 0.2 gram of chromic anhydride, ten milliliters of glacial acetic acid and one-half milliliter of water. This mixture was stirred and thereupon maintained eight hours at room temperature. Thereafter the mixture was poured into fifty milliliters of ice water and neutralized by the addition of dilute sodium hydroxide. The precipitate thus obtained was collected on a filter and recrystallized from ethyl acetone and Skellysolve B hexanes, three times, to give 2-methyl-9α-fluoro17α,21-dihydroxy - 4,6 - pregnadiene-3,11,20-trione 21-acetone (2-methyl-9α-fluoro-17α-hydroxy-21-acetoxy-4,6-pregnadiene-3,11,20-trione).

EXAMPLE 32

In the same manner given in Example 31, oxidizing in acetic acid solution with chromic anhydride in the presence of a small amount of water:

(a) 2 - ethyl - 9α - fluoro - 11β,17α,21 - trihydroxy-4,6-pregnadiene-3,20-dione 21-benzoate produces 2-ethyl-9α-fluoro - 17α,21 - dihydroxy - 4,6 - pregnadiene-3,11,20-trione 21-benzoate.

(b) 2 - methyl - 9α - fluoro - 11β,17α,21 - trihydroxy-4,6-pregnadiene-3,20-dione 21-propionate produced 2-methyl - 9α - fluoro - 17α,21 - dihydroxy - 4,6 - pregnadiene-3,11,20-trione 21-propionate.

(c) 2 - propyl - 9α - fluoro - 11β,17α,21 - trihydroxy-4,6-pregnadiene-3,20-dione 21-butyrate produced 2-propyl - 9α - fluoro - 17α,21 - dihydroxy - 4,6 - pregnadiene-3,11,20-trione 21-butyrate.

(d) 2 - benzyl - 9α - fluoro - 11β,17α,21 - trihydroxy-4,6-pregnadiene-3,20-dione 21-valerate produces 2-benzyl-9α - fluoro - 17α,21 - dihydroxy - 4,6 - pregnadiene - 3,11,20-trione 21 valerate.

(e) 2 - butyl - 9α - fluoro - 11β,17α,21 - trihydroxy-4,6-pregnadiene-3,20-dione 21-propionate produces 2-butyl-9α - fluoro -17α,21 - dihydroxy - 4,6 - pregnadiene - 3,11,20-trione 21-propionate.

(f) 2 - hexyl - 9α - fluoro - 11β,17α,21 - trihydroxy-4,6-pregnadiene-3,20-dione 21-phenylpropionate produces 2 - hexyl - 9α - fluoro - 17α,21 - dihydroxy - 4,6 - pregnadiene-3,11,20-trione 21-phenylpropionate.

(g) 2 - octyl - 9α - fluoro - 11β,17α,21 - trihydroxy - 4,6-pregnadiene-3,20-dione 21-hexanoate produces 2-octyl-9α-fluoro - 17α,21 - dihydroxy - 4,6 - pregnadiene - 3,11,20-trione 21-hexanoate.

EXAMPLE 33

*2-methyl-9α-fluoro-17α,21-dihydroxy-4,6-pregnadiene-3,11,20-trione*

In the same manner as shown in Example 14, 2-methyl-9α - fluoro - 17α,21 - dihydroxy - 4,6 - pregnadiene - 3,11, 20-trione 21-acetate was hydrolyzed in a nitrogen atmosphere with an aqueous alcoholic potassium carbonate solution to give 2-methyl-9α-fluoro-17α,21-dihydroxy-4,6-pregnadiene-3,11,20-trione.

EXAMPLE 34

*2-methyl-9α-fluorohydrocortisone 21-acetate*

A solution of one gram of 2-methyl-9α-fluoro-11β,17α, 21-trihydroxy-4,6-pregnadiene-3,20-dione 21-acetate and sixty milligrams of potassium hydroxide in 300 milliliters of anhydrous methanol was admixed with 0.1 gram of five percent palladium-charcoal catalyst suspended in fifty milliliters of anhydrous methanol. This solution was hydrogenated at one to 1.5 atmospheres pressure as shown in Example 15, at room temperature. After the selective hydrogenation was complete, the mixture was filtered and evaporated to give a residue I. The residue was extracted with methylene chloride to separate the potassium hydroxide and the extracts were evaporated to give a residue II. This residue II was dissolved in a mixture of five milliliters of acetic anhydride and five milliliters of pyridine. The thus obtained solution was allowed to stand at room temperature for a period of two hours and then poured into excess water. The thus obtained precipitate was collected on filter and recrystallized from ethyl acetate-Skellysolve B hexanes gave 2-methyl-9α-fluorohydrocortisone acetate of melting point 225 to 228 degrees centigrade.

Treating the solution of 2-methyl-9α-fluorohydrocortisone (residue II of above) in pyridine with acyl halide or acid anhydride of an organic carboxylic acid preferably of a hydrocarbon carboxylic acid is productive of other 21-esters of 2-methyl-9α-fluorohydrocortisone such as illustratively the propionate, the butyrate, the valerate, the hexanoate, the benzoate, the phenylacetate, the phenylpropionate, the 2-furoate, the β-cyclopentylpropionate, or the like.

EXAMPLE 35

*2-methyl-9α-fluorocortisone 21-acetate*

In the same manner as shown in Example 34, hydrogenating with hydrogen and palladium charcoal in methanolic potassium solution 2-methyl-9α-fluoro-17α,21-dihydroxy-4,6-pregnadiene-3,11,20-trione 21-acetate yielded the 2-methyl-9α-fluoro-17α,21-dihydroxy-4,6-pregnadiene-3,11,20-trione (2-methyl-9α-fluoro cortisone) which can be esterified with acetic anhydride in pyridine to yield 2-methyl-9α-fluorocortisone 21-acetate.

In the same manner as shown in Examples 34 and 35, selectively hydrogenating 2-lower-alkyl-9α-fluoro-11β,17α,21-trihydroxy-4,6-pregnadiene-3,20-dione or 2-lower-alkyl-9α-fluoro-17α,21-dihydroxy - 4,6 - pregnadiene-3,11,20-trione 21-acylates wherein the lower-alkyl group has from one to eight carbon atoms, inclusive, and the acyl group is of a hydrocarbon carboxylic acid containing from one to eight carbon atoms, inclusive, produces the corresponding 2-lower-alkyl-9α-fluorohydrocortisone and 2-lower-alkyl-9α-fluorocortisone.

Vigorous esterification procedures at high temperatures, above seventy degrees centigrade, give the triacylates of 2-methyl-9α-fluorohydrocortisone wherein the 11β, the 17α, and the 21-position are esterified. Vigorous esterification conditions used on 2-lower-alkyl-9α-fluorocortisone produces the corresponding diester that is 2-lower-alkyl-9α-fluorocortisone 17α,21-diacylates, which are active adrenocortical hormones with prolonged action.

It is to be understood that the invention is not to be limited to the exact details of operation or exact compounds shown and described as obvious modifications and equivalents will be apparent to one skilled in the art, and the invention is therefore to be limited only by the scope of the appended claims.

We claim:

1. A compound selected from the group consisting of 2α-lower-alkyl-11β,17α,21 - trihydroxy-4,6-pregnadiene-3,20-dione and 2α-lower-alkyl-11β,17α-dihydroxy-21-acyloxy-4,6-pregnadiene-3,20-dione wherein the lower alkyl radical contains from one to eight carbon atoms, inclusive, and the acyl group of acyloxy is of a hydrocarbon carboxylic acid containing from one to eight carbon atoms, inclusive.

2. 2α-methyl - 11β,17α,21 - trihydroxy-4,6-pregnadiene-3,20-dione.

3. 2α-methyl - 11β,17α,21 - trihydroxy-4,6-pregnadiene-3,20-dione 21-acetate.

4. A compound selected from the group consisting of 2α-lower-alkyl-9α-halo-11β,17α,21-trihydroxy - 4,6 - pregnadiene-3,20-dione and 2α-lower-alkyl-9α-halo-11β,17α-dihydroxy-21-acyloxy-4,6-pregnadiene-3,20-dione wherein the lower-alkyl radical contains from one to eight carbon atoms, inclusive, the acyl group of acyloxy is of a hydrocarbon carboxylic acid containing from one to eight carbon atoms, inclusive, and the halo atoms are of atomic weight 17 through 130.

5. 2α-methyl-9α-fluoro-11β,17α,21-trihydroxy-4,6-pregnadiene-3,20-dione.

6. 2α-methyl-9α-fluoro-11β,17α,21-trihydroxy-4,6-pregnadiene-3,20-dione 21-acetate.

7. 2α-methyl-9α-fluoro-17α,21-dihydroxy - 4,6 - pregnadiene-3,11,20-trione.

8. 2α-methyl-9α-fluoro-17α,21-dihydroxy - 4,6 - pregnadiene-3,11,20-trione 21-acetate.

References Cited in the file of this patent

UNITED STATES PATENTS

| | | |
|---|---|---|
| 2,738,348 | Colton | Mar. 13, 1956 |
| 2,739,974 | Colton | Mar. 27, 1956 |
| 2,797,229 | Ralls | June 25, 1957 |
| 2,848,464 | Fried | Aug. 19, 1958 |

OTHER REFERENCES

Journal of American Chemical Society, vol. 75 (1953), pages 5923. Sondheimer et al.

Journal of American Chemical Society, vol. 77 (1955), page 6401, relied on. Hogg et al.

Hogg et al.: J.A.C.S. 77, Dec. 5, 1955, pages 6401–6402.

UNITED STATES PATENT OFFICE
CERTIFICATION OF CORRECTION

May 23, 1961

Patent No. 2,985,671

J Allen Campbell et al.

It is hereby certified that error appears in the above numbered patent requiring correction and that the said Letters Patent should read as corrected below.

Column 5, line 26, for "(61-65° C.)" read -- (62-65° C.) --; column 7, line 34, for "4,6,17(20)-[20]" read -- 4,6,17(20)-[cis] --; column 10, line 19, for "dicethylhydantoin" read -- dimethylhydantoin --; line 74, for "triphydroxy" read -- trihydroxy --; column 12, line 51, for "Methyl 3,11-diketo-6-bromo-4,17(20)-[cis]-pregnadien-21-oate" read -- Methyl 3-acetoxy-11-keto-3,5,17(20)-[cis]-pregnatrien-21-oate --; column 18, line 11, for "propionayl" read -- propionyl --; column 21, line 37, for numeral "4,61" read -- 4,6 --; column 28, line 10, for "acetone" read -- acetate --; column 30, line 42, for "5923" read -- 5932 --.

Signed and sealed this 24th day of October 1961.

(SEAL)
Attest:

ERNEST W. SWIDER
Attesting Officer

DAVID L. LADD
Commissioner of Patents